Dec. 1, 1970   J. J. HARMON   3,544,966
METHOD AND APPARATUS FOR MULTIPLEX CONTROL OF A PLURALITY
OF PERIPHERAL DEVICES FOR TRANSFER OF DATA WITH
A CONTROL PROCESSING SYSTEM
Filed Dec. 27, 1966   11 Sheets-Sheet 7
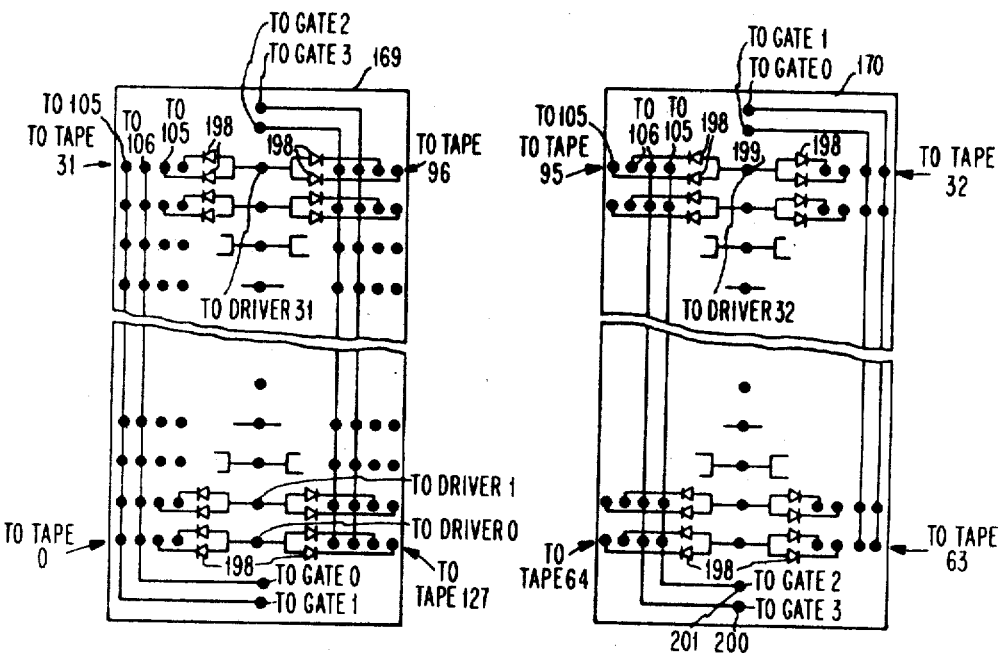
FIG.22   FIG.23
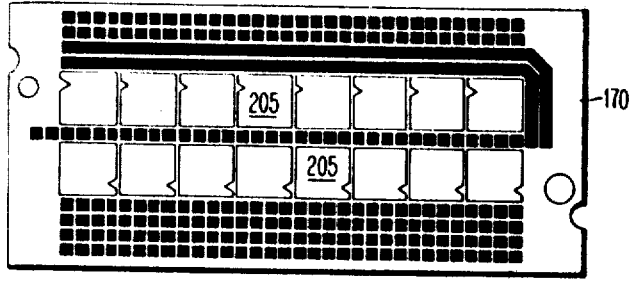
FIG.24   TOP
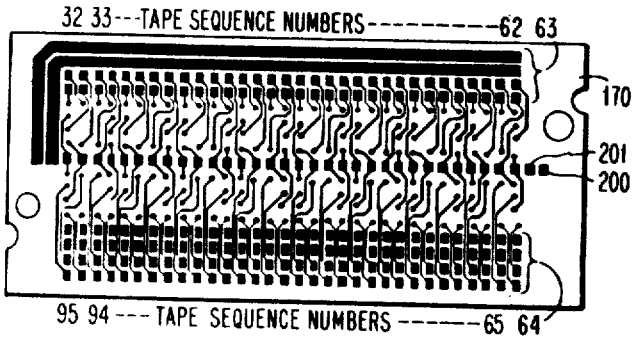
FIG.25   BOTTOM
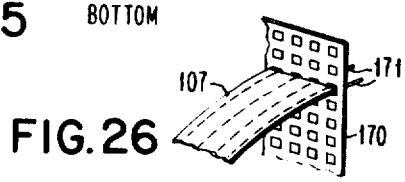
FIG.26
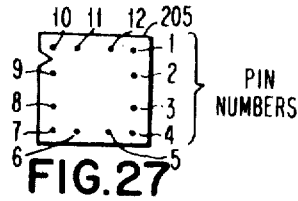
FIG.27
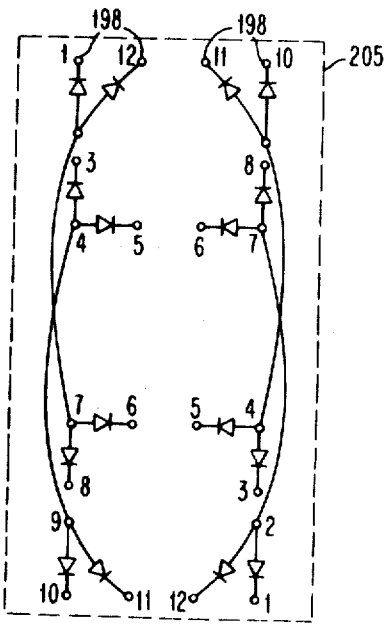
FIG.28

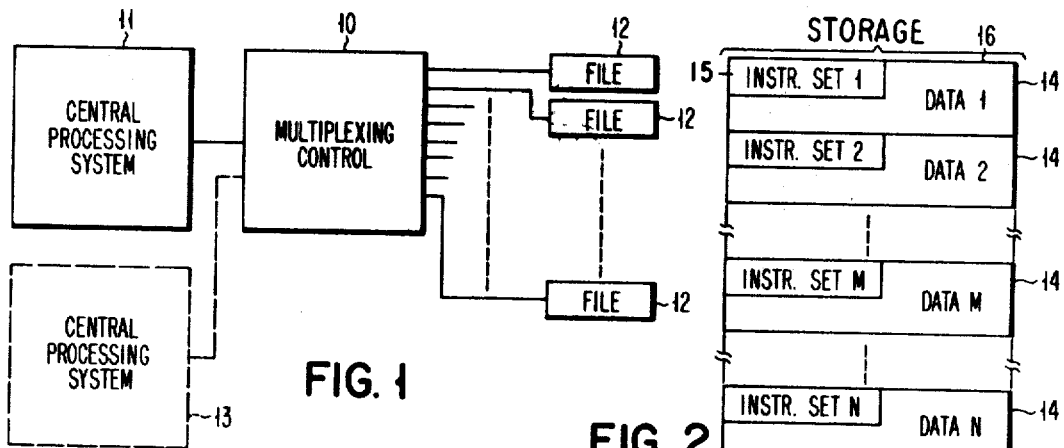
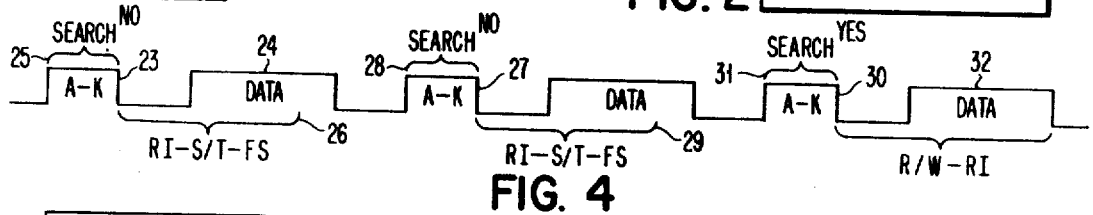
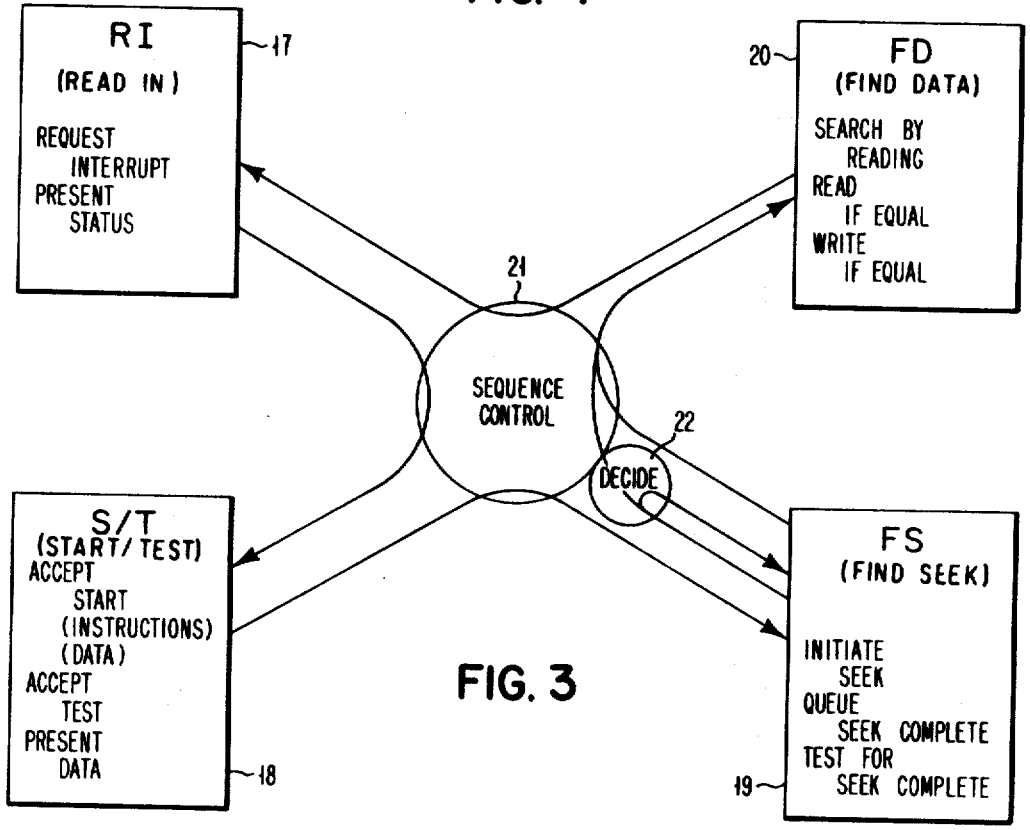
INVENTOR.
JOHN J. HARMON
BY John H. Holcombe
ATTORNEY

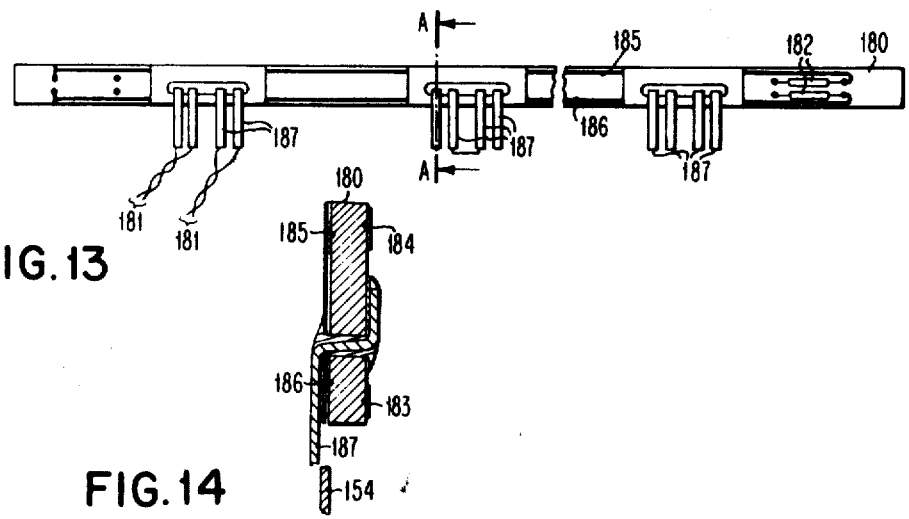
FIG.13
FIG.14
FIG.15
FIG.16
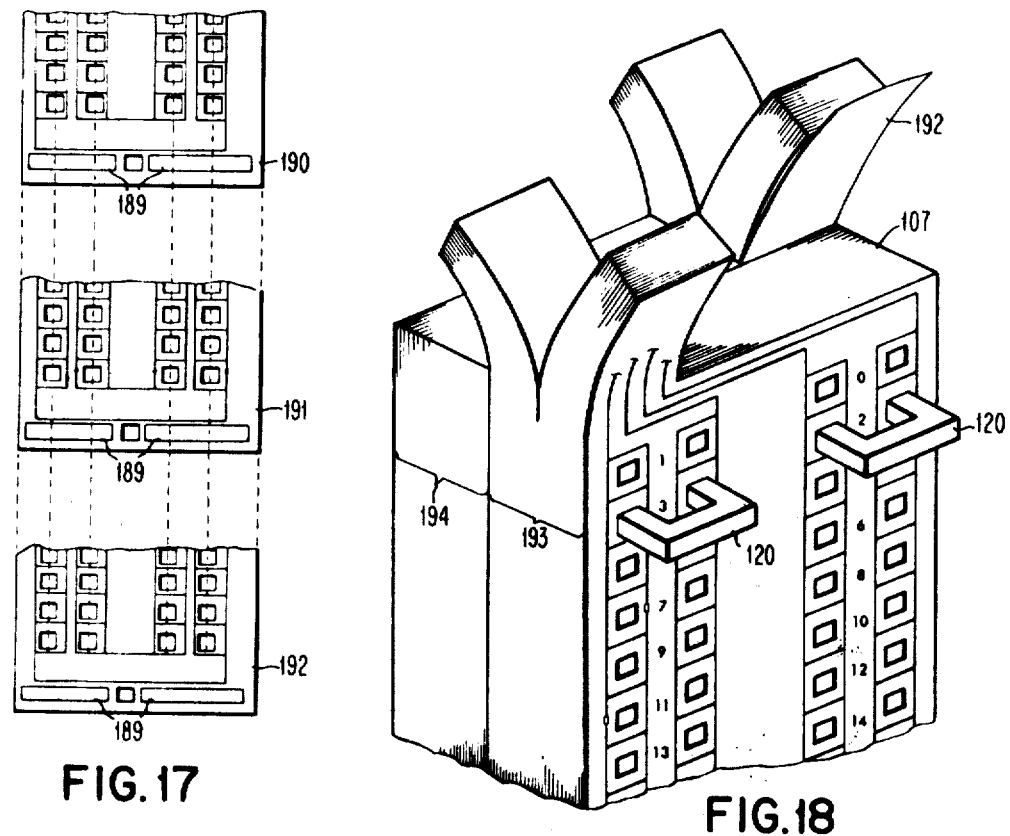
FIG.17
FIG.18

United States Patent Office 3,544,966
Patented Dec. 1, 1970

3,544,966
METHOD AND APPARATUS FOR MULTIPLEX CONTROL OF A PLURALITY OF PERIPHERAL DEVICES FOR TRANSFER OF DATA WITH A CENTRAL PROCESSING SYSTEM
John J. Harmon, San Jose, Calif., assignor to International Business Machines Corporation, Armonk, N.Y., a corporation of New York
Filed Dec. 27, 1966, Ser. No. 604,876
Int. Cl. G06f 9/18
U.S. Cl. 340—172.5     16 Claims

ABSTRACT OF THE DISCLOSURE

Control method and system for automatic queueing and sequencing of instructions to time-multiplex the transfer of data between a central processing system and a plurality of direct-access storage devices. After an initial communication with the control, the central processing system may transmit an instruction set relative to a specified peripheral device to the control, which inserts the instruction in a queue. The control multiplies the "seek" operations of the plurality of devices in accordance with the queued instructions, cycling through the various functions of the devices and communicating with the central processing system in predetermined sequences.

---

Figure 5:
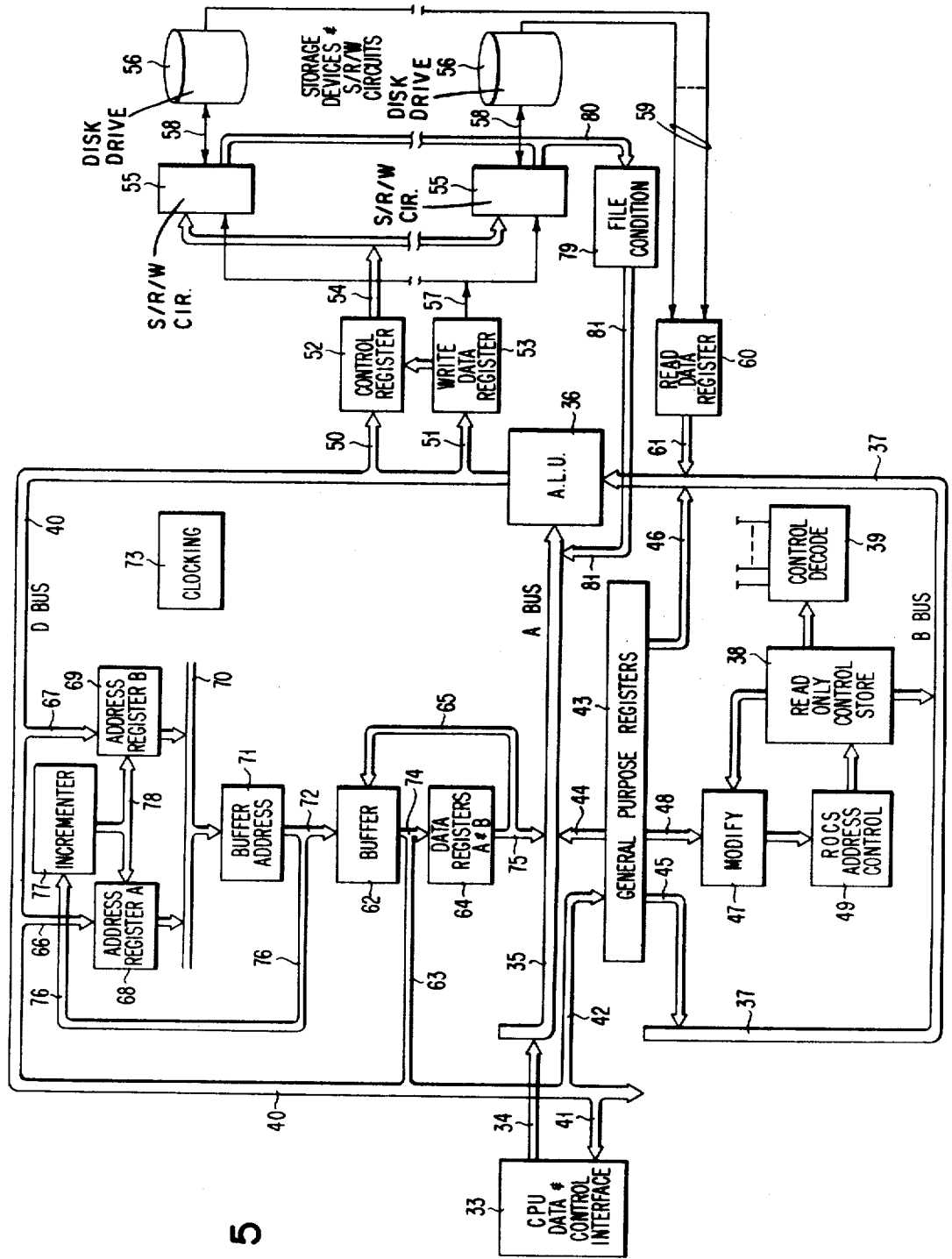

The present invention relates to high speed data processing systems, and more particularly to a method and to apparatus for controlling and effecting the transfer of data between a central processing system and plurality of peripheral devices.

At present, major problem limiting the throughput of a data processing system and limiting the performance available per dollar of costs lies in the area of data transfer between the central processing system and peripheral storage devices or input-output devices.

Considering the problem specifically with respect to storage devices, a considerable amount of CPU processing time is wasted in controlling and monitoring the operation of each storage device.

The typical central processing system comprises at least one central processing unit. The CPU consists of all the controls, arithmetic devices, and central memory required to perform the necessary manipulations of data. The central memory may, for example, comprise a high-speed magnetic core array for storing data during the processing thereof and for storing programming instructions for operating upon the data.

To read data from a peripheral storage device, the CPU must first dedicate a portion of the central core memory for accommodating the data which will be read. Then the CPU orders the storage device to seek the location having the desired data. The CPU immediately receives a signal from the control unit for the storage device indicating whether the instruction was proper in form and then the CPU stands by waiting for the control unit to indicate that the desired location is ready to be read. At this time, the CPU orders the control unit to transmit to the CPU the address or argument of each block of data immediately before it is read. This instruction may be called "search". Again, the control unit indicates whether the instruction was proper in form. The CPU continually transmits address or arguments to the control unit for comparison with that of the detected data until the comparison is equal. The equal comparison is an indication that the desired data has been located. The CPU then must command the control unit to read the desired data immediately since the data may immediately follow the address or argument. The data is thus transmitted from the storage device, usually in serial fashion, at the device rate, may be deserialized, and is then transmitted to the dedicated portion of the central core memory. The proces for writing data into the peripheral storage device is identical except that the data is storaged in the dedicated portion of the central core memory until written onto the storage device at the device rate.

Thus, in transferring data between the central processing system and a peripheral storage device, the steps occur in sequential fashion, each requiring precious time, and the device dictates the moment when transfer occurs.

For the entire period of time required for transfer, a portion of the central core memory must be dedicated to the data to be transferred and cannot be used in any other way. Also, each separate operation of the peripheral storage device is initiated, controlled and monitored by the central processing unit, taking time away from processing per se. Thus, the CPU is completely tied up between the time of initiation of the seek instruction until the data is actually transferred. Further, the data is transferred at the device rate, which is normally slower than the data transfer rate of the central core memory.

The CPU can work with only one peripheral storage device at a time. Thus, if it is desired to read data from a plurality of storage devices, the CPU must first operate one of the devices and transfer the corresponding data and then operate the next device in the sequence and transfer the data, etc. Consequently, the CPU is tied up for an extended period of time.

In some instances, a central unit of a storage device can accept a combined instruction from the CPU, such as "seek the track" and "search for the data." However, the central processing unit must still provide continuing supervision over the operation of the control unit and storage device, and must make available a portion of the central core memory to receive the data at whatever time it is read. Thus, the saving of CPU time is rather minute.

Previous advances in technology have been directed toward increasing the amount of data on a track, increasing the transfer rate of the device and allowing quicker access to the desired data. However, the saving in CPU time is only a small percentage. Advances in function have been provided by the interposition of a complex unit between the CPU and the control unit which allows the CPU to work on something else while waiting for the desired data. However, the complex unit then must essentially take over the above functions of the CPU, e.g., monitor, supervise, compare adddesses, etc. Further, the operation of a plurality of devices tied to this unit must still be accomplished in sequential fashion.

Continued operation of the CPU may depend upon receipt of the requested data. Throughput efficiency therefore cannot be high when the CPU must supervise control over the peripheral storage device control unit and must be available to receive data when it is read by the storage device. Although not properly called delays, because the system may be operating at peak performance, a great deal of the time utilization of the CPU is required for the transfer of data between the central core memory and the peripheral storage device.

Further, most central processing systems are equipped with a plurality of peripheral storage devices. If data is to be transferred between a first storage device and the CPU and then between another storage device and the CPU, the CPU must first supervise operation of the first device and transfer data at a time appropriate for the first device and then follow the same procedure with the second device. The sequential nature of the transfer operation remains true whether a separate file control unit is utilized for each device or the same control unit is used for both devices. This is caused by the fact that the CPU must exercise continuing supervision over operation of each device and must transfer data at the time appropriate for the device.

Therefore, it is an object of this invention to provide an improved method for handling data wherein any portion of the central core memory is dedicated only at the time the CPU desires to transfer data between the memory and a peripheral storage device.

Another object of the present invention is to provide an improved method of handling data freeing the CPU for data processing per se, free from interruptions.

Still another object of the present invention is to provide an improved method for handling data such that data is transferred to or from a CPU at a device independent rate more compatible to the CPU transfer rate and at the instant specified by the CPU, and is transferred to or from a peripheral storage device at the device rate and at the time required by the device.

Yet another object of the present invention is to provide an improved method of handling data by multiplexing the instructions controlling the operation of a plurality of storage devices and multiplexing the transfer of data between a CPU and a plurality of peripheral storage devices.

In accordance with this aspect of my invention, a method of multiplexing a control for plural storage devices is provided. The method comprises assigning one of first portions of a storage means to each one of the plural storage devices for storage of a plurality of instructions for the storage device, assigning one of second portions of the store to each one of the plural storage devices for storage of data associated with the plurality of instructions, entering from the CPU at least one instruction set, comprising a plurality of instructions, in at least one of the first portions of the store and any data associated with the instruction set in the corresponding second portion of the store, detecting the first instruction of each instruction set as received, detecting whether said instruction is of a type to be immediately executed, and, if so, selecting said instruction for execution and initiating execution of the selected instruction. During execution of said instructions, the method comprises scanning said devices in a predetermined order to detect one of said selected first instructions which has been completely executed, and executing the remaining instructions relating to that instruction set and alternately communicating with the data processing system to transmit data thereto, if available, and receive instructions and data therefrom, if available.

A further object of this invention is to provide data transfer apparatus allowing the central core memory to be employed for data processing during the initial operations preceding the data transfer between such memory and a peripheral storage device.

A still further object of the present invention is to provide data transfer apparatus which monitors the operation of the peripheral storage device in the accessing of date, thereby freeing the CPU for data processing per se, free from interruptions.

An additional object of the present invention is to provide a data handling device for transferring data to or from a central processing system at a device independent rate more compatible to the central processing system transfer rate and at the instance specified by the central processing system, and is transferred to or from a peripheral storage device at the device rate and at the time required by the operation of the device.

Still another object of the present invention is to provide multiplexing apparatus which accomplishes multiplexing of the instructions controlling the operation of a plurality of peripheral storage devices and time multiplexes the transfer of data between a central processing system and the plurality of peripheral storage devices.

In accordance with this aspect of my invention, multiplexing control apparatus is provided for controlling a plurality of peripheral storage devices. The apparatus comprises file control apparatus connected to a plurality of peripheral storage devices, the file control being adapted to communicate with any file at any one time. Included within the multiplexing control is a plurality of storage means, one of each peripheral storage device operatively connected to side file control. Each storage means is divided into a first and a second portion. Means is provided for indicating to the central processing system that instructions may be received therefrom. The central processing system may then transmit at least one instruction set, comprising a plurality of instructions, and data associated with the instruction set, to the multiplexing control. The central processing system must indicate which instruction set and associated data applies to which peripheral storage device. Means is provided for entering each instruction set in the first portion of the storage means corresponding to the selected peripheral storage device, and entering any data associated with the instruction set in the corresponding second portion of the storage means. Detection means is provided, associated with the entering means, for detecting the first instruction of each instruction set and deciding whether said instruction is of the type to be immediately executed. If so, the detecting means selects the instruction for execution. Operating means then controls the file control to operate the selected storage device and execute the selected instruction. Monitoring means is provided to examine the storage devices in a predetermined order and selects the first one encountered which has completed the first selected instruction of the instruction set. Upon making such selection, the monitoring means activates operating means to read from the storage means the remaining instructions in the corresponding instruction set and control the file control to operate the storage device, executing the remaining instructions of the instruction set, and alternately communicate, during said operation, with the data processing system to transmit data thereto, if available, and receive further instructions and data therefrom, if available.

A feature of the present invention comprises the ability of the multiplexing control to be connected to a plurality of central processing systems, each one capable of utilizing the peripheral storage devices not being utilized by the other central processing systems. To designate the central processing system utilizing a peripheral storage device, it is necessary only to provide a special designating code character in the instruction set for the device being so utilized.

Figure 33:
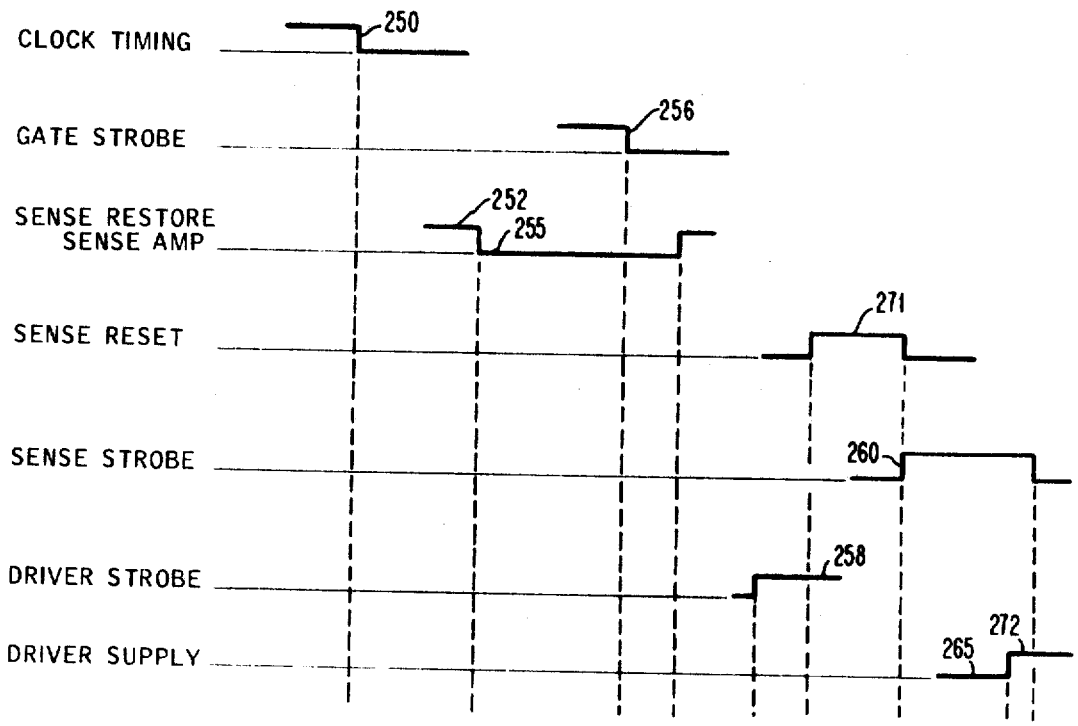

The foregoing and other objects, features and advantages of the invention will be apparent from the following more particular description of a preferred embodiment of the invention, as illustrated in the accompanying drawings. In the drawings herein:

FIG. 1 is a block diagram showing the overall data processing system including the multiplexing control of the subject invention FIG. 2 comprises a diagrammatic representation of the storage means forming a part of the multiplexing control apparatus of the invention;

FIG. 3 comprises a diagrammatic representation of the sequencing control and functions performed by the present invention;

FIG. 4 comprises an illustration of the format for data stored on a file 12 of FIG. 1;

FIG. 5 comprises a block diagram of a multiplexing control apparatus constructed in accordance with the present invention;

FIGS. 6–32, 34 and 35 are detailed illustrations of the read only control store of FIG. 5; and FIG. 33 is a graphic representation of waveforms of signals employed in the read only control store of FIG. 5.

Referring to FIG. 1, a multiplexing control 10 operated in accordance with the methods of the present invention receives a plurality of instructions from a central processing system 11, which instructions relate to one or more of the peripheral storage devices (files) 12. There multiplexing control, by means of the subject method, controls the operation of files 12, executing the supplied instructions without continuing supervision from the central processing system 11. Additional central processing systems 13 may be connected to the multiplexing control 10 and thereby obtain access to the files 12.

FIG. 2 illustrates the plurality of storage means 14, wherein each storage means corresponds to one of the files 12 of FIG. 1. Each storage means 14 is divided into two parts 15 and 16. The first portion 15 comprises means for storing the instructions received from the central processing system 11 for execution, and the second portion 16 provides means for storing any data associated with the instructions. For example, if the instruction set stored in portion 15 includes an instruction to write data into the file 12, the data to be written will be supplied by the central processing system 11 to the multiplexing control and is stored in portion 16. In another example, the instruction set stored in portion 15 may include a request that the multiplexing control read data from a file 12 to be transmitted to the central processing system. When the data is so read, it will be stored in portion 16 of the storage means until such time as it is transmitted to the central processing system.

FIG. 3 comprises a schematic illustration of the various functions performed by the multiplexing control 10 together with the sequencing between these functions to allow the most efficient multiplexing of the instruction set 15. The functions are arranged in categories 17–20 for ease of illustration.

Category 17 is named RI which stands for Read-In, and category 18 is named S/T which stands for Start-Test. By means of the functions included therein, the multiplexing control 10 communicates with the central processing system 11 and vice versa. By means of the functions contained in general categories FS 19, meaning Find-Seek, and FD 20, meaning Find-Data, the multiplexing control communicates with and operates files 12.

The functions encompassed within these categories are described in a nonmultiplexing environment in IBM Field Engineering Theory of Operation (Manual of Instruction), 2841 Storage Control Unit, Form No. 227-3614-3, published Apr. 15, 1966, and IBM Field Engineering Manual of Instruction, 2311 Disk Storage Drive, Form No. 227-5897-2, published Jan. 31, 1966, both published by IBM Systems Development Division, Product Publication, Department 455, Building 014, Monterey and Cottle Roads, San Jose, Calif. 95114. The apparatus for accomplishing the above functions is identical to that utilized in the subject multiplexing control with the exception of the storage means shown in FIG. 2, the sequence control 21, decision logic 22 and other specific exceptions, all described hereinafter.

The "request interrupt" function shown in RI grouping 17 comprises the presenting of a predetermined voltage by the multiplexing control upon a wire leading from the multiplexing control to a selected central processing system. This means that the multiplexing control has been sequenced through various functions by the sequence control 21 and is able to communicate with the selected central processing system. The multiplex control maintains this voltage for a predetermined time (whereupon the sequence control switches to category 19).

The central processing system may accept the request interrupt and indicate that it is available to accept status data from the mutiplexing control. If so, circuitry within the control will perform the function of "present status." This comprises transmitting the address of the multiplexing control 10 and one file 12 attached thereto, the status of which is to be presented, and data representing the status, a single bit which is on or off. The "on" bit means "your requested job is complete" and the "off" bit means "your requested job is not complete due to a problem". The status bit may be derived from such things as "data has been read from the file and is presently stored in storage means 16", "data from storage means 16 has been written into the file, completing the instruction set 15," "the instruction set 15 has not been completed due to an error condition" or "the particular file is busy or reserved to another central processing system".

Within the above predetermined time, the address and central processing system may initiate any of the S/T functions 18 or may remain silent. If the latter, the sequence control switches to FS functions 19 at the end of the predetermined time. If the former, the central processing system transmits the command and all instructions and data which must accompany it. If the instruction is received at any time before the end of the predetermined time, all of the data associated with the command will be received or transmitted by the multiplexing control even though the completion thereof may extend beyond the predetermined time.

Considering S/T category 18, the "accept start" function comprises the transmission by the central processing system of a "start I/O" command together with an address which identifies the multiplexing control 10 and the queue postion 14 and 15 (file 12) desired. The multiplexing control checks a register to determine whether there is something in the selected queue position that has not been completed and either accepts or rejects the command. If accepted, the command is followed by an instruction set and associated data, if any. The instruction set includes codes designating selected ones of the functions listed in categories 19 and 20. Thus, if a search instruction is included, the data upon which the search is based must be transmitted therewith. Likewise, if the instruction set includes a write instruction, the data to be written must be transmitted therewith.

The function "accept test" comprises transmission of a "test" command from the central processing system together with the address identifying the particular multiplexing control 10 and the instruction set 15. This instruction is automatically accepted by the multiplexing control, the instruction set and associated registers queried to determine in detail the status of the instructions within the instruction set, the extent executed and any errors or problems encountered. This data is transmitted by the multiplexing control to the central processing system over a plurality of parallel wires comprising a data bus.

The function "accept test" comprises transmission of a data" command from the central processing system together with a designation of the multiplexing control and the particular instruction set. In response thereto, the multiplexing control queries the selected instruction set 15 to determine that the read instruction in the instruction set has been executed and that the appropriate data is in the associated portion of storage 16 dedicated to the data. If not, the instruction is refused, and if so, it is accepted. Upon acceptance, the multiplexing control transmits the data from the data area 16 of storage 14 to the central processing system over the data bus and effects the erasure of the instruction set and data by setting a bit in the above-mentioned register.

Upon completion of the function of the S/T category 18 or the expiration of the predetermined time, the sequence control 21 switches to category FS, standing for Find-Seek.

Assuming that the selected function in category 18 comprised an "accept start" accepted by the multiplexing control, and the instruction set included a "seek" instruction (which is invariably true), the sequence control 21 immediately cycles to FS category 19 and operates the "initiate seek" function.

The function "initiate seek" comprises an insertion of the address of the desired "cylinder" (see section 1.3 of the above-cited IBM Field Engineering Manual of Instruction, 2311 Disk Storage Drive, page 3.1) into the cylinder address register (see section 2.8 of the above reference, page 2.21) of the selected device by the multiplexing controller.

Upon operating the initiate seek, the sequence control 21 switches back to the S/T category 18 for a shorter predetermined period of time during which the central processing system may transmit a command comprising one of the functions included within the category. Similarly, if a first function commanded by the central processing system had been "accept test" or "present data," the sequence control cycles to FS category 19, does nothing and returns to category S/T for the shorter predetermined time. The recycling continues so long as the central processing system 11 continues to supply a command during each such predetermined time period.

Upon termination of a predetermined period without receipt of a command from the central processing system 11, the sequence control 21 cycles to FS category 19.

When a seek has been completed (meaning the heads have been positioned at the desired cylinder), the device informs the multiplexing control by transmitting the address of the cylinder. Whenever so notified, the multiplexing control automatically sets a bit in a register corresponding to that device regardless of the sequence control operation. This operation is called "queue seek complete" and is included in category 19. Thus, if a number of instruction sets had been received from the central processing system during a number of S/T time sequences, each followed by an initiate seek function, a number of seeks may be completed by the time the central processing system ceases sending instructions. The seek completes would have automatically been recorded in the respective registers as they had been completed.

Upon recycling to FS category 19 after the final S/T time sequence, wherein no command is received, no seek is initiated, since none was received. Rather, the sequence control refers to decision logic 22 to determine whether any instruction set 15 has been partially, but not completely, executed.

If the answer is "yes," the sequence control immediately sequences to FD category 20. If the answer is "no," the sequence control automatically sequences back to F/S category 19.

After the decision to cycle back to category 19, the "test for seek complete" function occurs. This comprises merely testing the registers cueing the seek completes to determine if any has been set. The registers are tested in a predetermined order until one indicates a seek complete. At this time, the sequence control cycles to the FD category and executes the next instruction in the instruction set 15 relating to that file.

The "search by reading" function in FD catgory 20 comprises reading a selected portion of information recorded on a selected track and translating this data to the multiplexing control which compares the data with an argument provided in the instruction set 15. The typical system may be programmed to provide a positive comparison (a "hit") if the data read is identical to the argument ("equal") or if it differs from the argument in some predetermined manner (higher, higher or equal, lower, lower or equal, etc.) For the purpose of illustration, the subject multiplexing control 10 is assumed to provide an indication of a "hit" only if the data and the argument are "equal."

If the comparison circuitry indicates a hit, the sequence control 21 remains in FD category 20 and refers to the instruction set 15 for the device just searched for the next instruction in the instruction set. This instruction will comprise either a read instruction or a write instruction. If the instruction is to read, the multiplexing control causes the data immediately following that search to be read from the device and stored in the data area 16 for that device serially. If the instruction is to write, the multiplexing control serially reads the data from the data area 16 for that device to the file 12 which records the data immediately following that which was searched.

The means and methods for searching, reading and writing are described fully in the above cited references.

If the search indicates no hit, or upon completion of the read or write function, the sequence control 21 cycles to the RI category 17 for a predetermined time, as already discussed.

The following example comprises an illustration of the operation of the above-descirbed apparatus.

It is assumed that the multiplexing control 10 begins operation in the "power on" condition with storage means 14 empty of instructions and data. In such case, the sequence control 21 raises the request interrupt within RI category 17 for a predetermined time.

During this time period the central processing system 11 transmits a "start I/O" command to the multiplexing control 10. This command includes the designation of (a) the multiplexing control and (b) the file 12. As a result, the sequence control 21 jumps to S/T category 18 in order to accept or reject the start I/O command. Assume that the command refers to device No. 2. The multiplexing control then refers to the register designating whether the storage means 14 relating to device No. 2 is being used or is clear. In this case, the storage means is clear and the multiplexing control opens a gate to the storage means 14 for device No. 2, accepting the start command.

The central processing system 11 now transmits information comprising an instruction set and accompanying data, if any, to the multiplexing control 10. This information is gated into the storage means 14.

Upon completion of the instruction and data transfer, the sequence control 21 cycles to FS category 19 and initiates the seek instruction contained within the instruction set transmitted to storage means 14. The sequence control 21 then cycles back to S/T category 18 to see if another command is received from the central processing system.

Assume that during this time period, the central processing system 11 transmit a start I/O command to the multiplexing control designating file M. The sequence control checks the register associated with that file, noting that the associated instruction set is clear. The sequence control thus operates a gate to accept the instruction set and associated data, if any, from the central processing system for storage in storage means 4 file M. Upon completion thereof, the sequence control 21 then cycles to FS category 19 and initiates the seek from instruction set M.

Again, sequence control 21 cycles back to S/T category 18 for a predetermined time. At the end of this predetermined time, no commands have been received from the central processing system, so that sequence control 21 cycles back to FS category 19. Since there are no uninitiated seeks, the sequence control refers to decision logic 22 to determine whether an instruction set has been partially completed. In this case, the answer is "no," so the sequence control refers back to category FS.

Assume that, at some point during the time required by the above two paragraphs, the seek for device M was completed and the associated register thereby set to indicate such completion. When the sequence control cycles back to FS category 19, it checks the registers in predetermined order until detecting a seek complete in the register associated with file M.

The sequence control 21 now cycles to FD category 20 and refers to instruction set 15 for file M and reads the first instruction subsequent to the seek. Almost invariably, this instruction will be a search instruction together with the data upon which the search is to be based.

FIG. 4 illustrates an example of the layout of data along a single track. Preceding the data 24 is a block 23 comprising the address of the data or a key. An address comprises the numerical ordered position of the data in a string of data, and a key comprises a number related to the data in some way other than the position in storage of the data. An example of a key is a social security number. The block 23 preceding the data may thus in practice comprise a series of blocks or a single block and be an address, a key or both.

Upon detecting the beginning of an address-key block 23, preceding the associated data 24, gating circuitry operates to serially read out the contents of block 23. Simultaneously, the data for locating the A-K block (the argument) is gated serially from instruction set M into the comparison circuitry. Within the comparison circuitry, a serial bit-by-bit comparison is made between the information from the file and the information from the instruction set. The time required for a complete search is shown by bracket 25. In this case no comparison or, "hit," is made and the sequence control 21 cycles to RI and S/T categories 17 and 18.

At this time, the central processing system 11 transmits a start I/O command to the multiplexing control designating file No. 1. The multiplexing control checks and determines that the storage means associated with file No. 1 is clear and accepts the subsequent instructions and data from the central processing system. The sequence control 21 then cycles to FS category 19 and initiates the seek command contained in the instruction set just received for file No. 1.

About this time it is assumed that the previously issued seek for file No. 2 is completed and the multiplexing control automatically queues the seek complete in the register associated with device No. 2.

Upon initiating the seek for file No. 1, the sequence control cycles back to S/T category 18 for a predetermined time. It is assumed that this time lapses without receipt of further commands from the central processing system. Thus, the sequence control 21 cycles back to FS category 19.

Since no seek is to be initiated at this time, the sequence control refers to decision logic 22 to determine whether any incomplete instruction sets are being executed. The decision logic notes that a search is being conducted at file M and is not completed. The sequence control 21 therefore cycles to FD category 20 and resumes the search.

Referring to FIG. 4, the sequencing between categories RI, ST and FS is indicated by bracket 26. This time, the multiplexing control 10, waits for the beginning of the A-K block 27 and institutes a comparison of that block with the information in instruction set 15 for file M. The duration of the search is indicated by bracket 28.

Assuming that no comparison is made, the sequence control cycles to categories RI and S/T, as shown by bracket 29. The sequence control then waits for the predetermined time during which no command is received from the central processing system. At the conclusion of the predetermined time, the sequencing control cycles to FS category 19, initiates no seek since none was received, and refers to decision logic 22. The decision logic indicates that the search of file M is still in process. Thus, the sequence control 21 cycles to FD category 20 to continue the search on file M.

The multiplexing control 10 now compares the contents of A-K block 30 to the argument from the instruction set M. The search continues for the duration of bracket 31 which indicates a "hit." In response thereto the sequence control 21 immediately reads the following instruction in instruction set M and acts accordingly.

Assume that the immediately subsequent instruction comprises a read instruction. Hence, the sequence control switches to the "read" operation. Hence, the information appearing at the read head is gated serially to the data area 16 of the storage means 14 for file M. Upon reaching the end of the data, the gate closes to prevent further reading.

The sequence control 21 then cycles to RI category 17 and transmits a request interrupt to the central processing system. The signal indicates that the multiplexing control desires to present status to the central processing system. The status in this case will be that all instruction have been completed properly; there was no error.

The central processing system 11, however, is not prepared to accept the status and lets the predetermined time period elapse without response. The status is now "stacked," and an attempt will be made to present status to the central processing system each time the sequence control cycles to RI category 17.

The sequence control now cycles to FS category 19 and, since there is no seek instruction to initiate, refers to decision logic 22. The decision logic notes that there are no partially completed instruction sets and causes the sequence control to cycle back to category 19.

At this moment, it is assumed that the seek in operation on file No. 2 is completed and the seek complete queued in the appropriate register.

The multiplexing control, now at category 19, tests for a seek complete by scanning the registers in a predetermined order. It is thus assumed to test the register corresponding to file No. 1 before that of file No. 2. Therefore, the seek complete queued for file No. 1 is detected and the sequence control cycles to FD category 20 and detects the next instruction for file No. 1. The instruction is for a search by reading, which operation is initiated. The comparison between the data from the address-key block is therefore serially compared with the data accompanying the search instruction. Assume that the search is positive and the comparison indicates a "hit."

The multiplexing control immediately queries instruction set 15 for file No. 1 to determine the subsequent instruction. This instruction is assumed to be a "write" instruction, which is immediately executed by the multiplexing control. Hence, data appearing in data storage area 16 of the storage means 14 is written onto the selected track of file No. 1. Upon completion thereof without noting an error, the completed status for file No. 1 is queued adjacent that of file M.

The sequence control 21 now cycles to RI category 17 and again plays the request interrupt operation and attempts to present the status of file M.

During the predetermined time, the central processing system looks to receive the status from the multiplexing control. The status of device M is thus presented, erasing the register in which it was stored and the status of device No. 1 is transferred to that register to be presented subsequently.

The central processing system notes the status of device M in that the desired data therefrom is stored in data storage area 16 of storage means 14 for device M. The central processing system thus transmits a "present data" command to the multiplexing control. The multiplexing control responds by transmitting the data stored in data area 16 for device M to the central processing system in parallel by bit, serial by byte fashion over the data bus.

Upon the conclusion of this transmission, the sequence control 21 again presents a request interrupt to the central processing system. The central processing system again responds and requests the data to be presented. The multiplexing control thus transmits the status of device No. 1 to the central processing system. The central processing system notes that the instruction has been to write data and the status indicates that this was done without error. Therefore, the central processing system was satisfied.

Upon completion of the predetermined time without receipt of further commands from the central processing system, the sequence control 21 cycles to FS category 19. Since there are no seeks to initiate, the sequence control refers to decision logic 22. The decision logic indicates that there is no partially completed instrtuction set. The multiplexing control thus tests for a seek complete.

The multiplexing control thereby notes that the seek for file No. 2 has been completed and cycles to FD category 20. The subsequent instruction detected in instruction set 15 for device No. 2 comprises a "search by reading" instruction. Thus, a search is instituted, as above, in which it is assumed no comparison is made.

The sequence control now cycles to RI category 17 and transmits a request interrupt signal. During the predetermined time period, it is assumed that no commands are received from the central processing system 11.

The sequence control now cycles to FS category 19, does not initiate a seek, and refers to decision logic 22. The circuitry 22 indicates that a partially completed command appears in the instruction set for device No. 2. Thus, the sequence control cycles to FB category 20. It is assumed that the search indicates a "hit" so that the multiplexing control refers to the immediately following instruction and the instruction set for device No. 2. This instruction is assumed to be a write, causing the multiplexing control to write the data appearing in data areas 16 for device No. 2 onto file No. 2.

Upon completion of writing the data onto file No. 2, the sequence control cycles to RI category 17. A request interrupt signal is transmited to the central processing system 11. It is assumed that the central processing system responds to the signal by requesting status from the multiplexing control. The status is presented, indicating that the desired data has been written on file No. 2 without error. The central processing system is thus satisfied.

It is seen from the above that the central processing system 11 has communicatted with three files during this single time period in a parallel fashion. It has been received from and transmitted to the central processing system at times and at speeds determined by the central processing system. The same data has been transmitted to and received from the selected file 12 at times and at speeds compatible with each file. The normally time consuming search operation has been utilized to allow a single set of file control equipment to multiplex transfer of data to a plurality of files.

Referring to FIG. 5, apparatus is shown for accomplishing the above functions. A portion of the apparatus of FIG. 5 comprises that described in the above-identified references: IBM Field Engineering Theory of Operation, Form No. 227–3614–3 and IBM Field Engineering Manual of Instruction, Form No. 227–5897–2.

The following apparatus is identical to that described those publications. The CPU data and control interface 33 comprises circuitry which communicates directly between the CPU and the file control circuirty. In the above publications, this circuitry is described as being able to communicate with a CPU or a "channel." The channel comprises apparatus for interfacing between a CPU and a plurality of file controls. Data and information from the CPU is transmitted on wires making up a cable 34 to "A' bus 35. The A bus 35 comprises a set of parallel wires connected to an arithmetic logic unit 36. The second input to arithmetic logic unit 36 comprises a set of wires called "B" bus 37.

The arithmetic logic unit 36 comprises a set of logic and gating circuits which are operated under the control of read-only control store 38 and control decode circuitry 39 to perform various functions. The functions which are important here are those of transmitting data from A bus 35 or from B bus 37 directly onto a "D" bus 40, and of comparing data appearing on A bus 35 with a data appearing on B bus 37 to indicate whether or not the data is equal. Data appearing on D bus 40 is transmitted on lines making up cable 41 to CPU data and control interface 33 and on cable 42 to a set of general purpose registers 43. General purpose register 43 comprise various registers, each of which are capable of storing bits of data presented in parallel from D bus 40. The transfer of data from D bus 40 to any register on cable 42 and the transfer of data from any register to B bus 37 on cables 45 or 46 or to modifying circuitry 47 on cable 48 or to A bus 35 on cable 44 are controlled by the operation of gating circuits. The gating circuits, in turn, are controlled by pulses appearing on outputs from control decode circuitry 39. Data gated from D bus 40 into a specific register held, unchanged, in the register until new data is entered, and the data may be gated out at any time upon cables 44, 45, 46 or 48.

Read only control store 38 comprises a plurality of permanent read-only storage units. Each unit comprises a single input line and a plurality of individual output lines. An address supplied to address control circuitry 49 is decoded thereby to select one of the read-only storage units. This selection comprises establishment of an input pulse upon the single input to the read-only storage unit. By virtue of its configuration, the selected read-only storage unit then provides output pulses on selected ones of a plurality of lines from the read-only control store module 38. These pulses operate logic decoding circuits in control decode circuitry 39. This decoding provides signals on various lines which control various operations in the arithmetic logic unit 36, control the gating to and from the general purpose registers 43 and control the gating of data to and from CPU data and control interface 33 and control the operation of various circuits to be detailed hereinafter.

The read-only storage unit also provides outputs to modifying circuitry 37, which outputs comprise the primary addressing data for addressing the next read-only storage unit. This circuitry may modify the primary address data with data on cable 48 from a general purpose register 43 to alter the code thereof to cause address control register 49 to select a read-only storage unit different than that which would have been selected without such modification.

Data from D bus 40 may be transmitted over lines 50 and 51 to a control register 52 and a data register 53. The transmission of data to control register 52 or input data register 53 is accomplished by operation of gating circuits which are controlled by lines from control decode circuitry 39.

TRANSFORMER READ ONLY STORAGE—TROS

The purposes and use of TROS 38 are that the output of TROS controls machine functions. One output word is read out at a time and is called a micro-instruction. A chain of micro-instructions is called a microprogram.

The contents of any TROS word can be read out and stored in latches. This latched information is decoded 39 and used to control machine functions. Part of the information read out of a particular TROS word is used to determine 47 the next TROS word to be addressed.

The TROS words are addressed in a particular sequence, and this sequence of addresses is called a microprogram. To perform any operation in the machine, the various parts of the control unit (ALU, registers, etc.) are controlled by the microprogram to perform certain functions in a given sequence.

The characteristics and capacity of TROS are that TROS contains fixed predetermined information, TROS can only be read out, and a 12-bit address is used to select the next word to be read out.

TROS contains fixed, predetermined information which can only be read out. The stored information can be altered only by physically changing TROS.

TROS units can be built in various storage capacities. A 12-bit address register 49 is used to address the words in the TROS unit 38. The TROS word may vary from 48 bits long to a maximum possible length of 60 bits.

TROS is built up of modular units, each having 256 addressable words, each word having a length of 48 to 60 bits.

The principles of operation are illustrated by reference to FIGS. 6–9. TROS uses the current transformer principle. Sixty transformers 100, 101 are selectively linked with drive line 102 to provide one TROS word output. A drive line 102 links 103 with a transformer in positions where a 1-bit output is required. A drive line bypasses 104 a transformer in positions where a 0-bit output is required. Each of two drive lines 105, 106 on one flexible plastic tape 107 links the selected transformers. One of the two drive lines on each tape is selected to read out a TROS word. The TROS transformer consists of a U-core 120 and an I-core 126. Etched copper drive lines 105, 106 on plastic tape 107 are selectively interrupted by punched holes 110–113 to either link or no link transformers.

Figure 6:
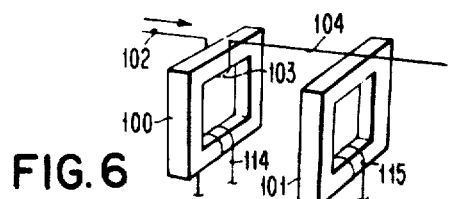

The transformer principle is shown in FIG. 6. When a current pulse is passed through the primary winding 103 of a transformer 100, it induces a current pulse in the secondary winding 114. If no primary current pulse flows 104 (or there is no primary winding), there is no output in the secondary winding 115. This is the principle of TROS operation.

The primary 103 of the transformer 100 is an addressed drive line 102 and the secondary 114 of the transformer 100 forms the sense winding. When a drive line links wtih a transformer core a current pulse in this drive line induces a current pulse in the secondary winding. If the same drive line 102 bypasses 104 a transformer 101, no current pulse is induced in that particular sense winding 115. A pulse in the sense winding represents a 1-bit. No sense winding output represents a 0-bit. Additional drive lines could be used in a similar manner.

Figure 7:
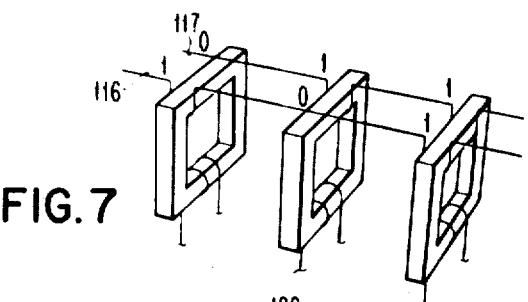

An example is shown in FIG. 7. A current pulse in drive line 116 gives a binary output of 101. A current pulse in drive line 117 gives an output of 011.

Figure 10:
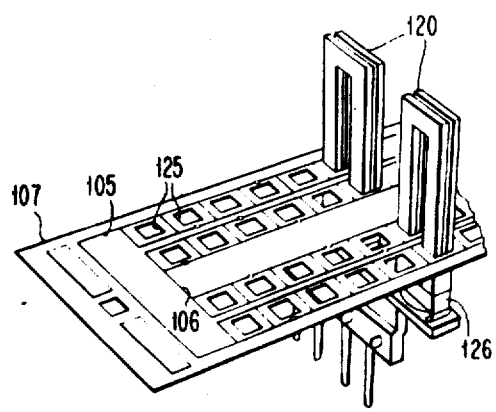

Referring to FIG. 10, the 60 transformer cores 120 associated with each TROS tape 107 give an output of 60 bits. Two drive lines 105, 106 for each set of 60 cores allow two different bit configurations depending on which drive line is selected.

TROS drive lines 105, 106 are etched in copper on flexible plastic tapes 107. On each tape, two drive lines are printed, both in the form of a ladder network. Holes 125 are punched between the rungs of the ladder so that U-cores 120 can be inserted through the tapes to mate with the I-cores 126.

Figure 8:
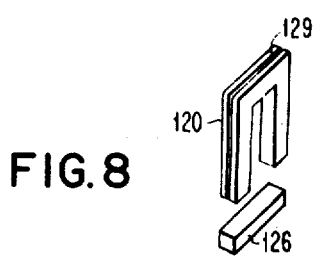

Referring to FIG. 8, the core of a TROS transformer consists of two parts, a U-core 120 and an I-core 126. Both the U-core and the I-core are made of soft, low-remanence ferrite. To reduce flux leakage, the U- and I-cores are first coated with an insulating material and then copper plated. A sense winding of 35 turns is wound on the I-core and the U-cores are gapped 129 on their outside face to prevent the plate from acting as a short circuited turn.

Control register 52 comprises suitable decoding logic and storage registers for decoding and storing data supplied it from D bus 40. The outputs of the control register control and direct the operation of a plurality of disk files with seek/search/read/write apparatus 55 and drives 56.

Input data register 53 converts the data supplied it from parallel to serial form and directs the serial output over line 57 to the disk files. Control register 52 controls the disk files to cause the proper disk file to write the data from data register 53 thereon over the selected line 58.

Likewise, control register 52 may operate a desired disk file to read data therefrom and transmit such data over the proper line 59 to output data register 60. This register converts the serial data to parallel data and, when gated by a gating circuit under the control of one of the lines from control decode circuitry 39, transmits the data in parallel on lines 61 to B bus 37.

Figure 9:
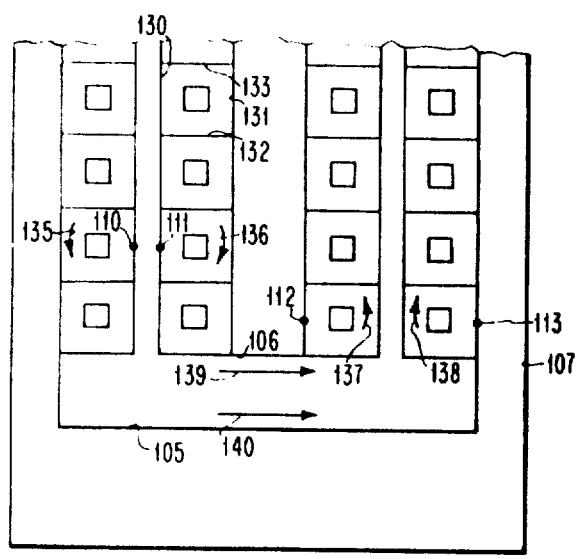

Interrupting the drive lines to store a logical 0 to 1 is shown in FIG. 9. Each leg of the U-core, when inserted in the tape, is encircled by the sides 130, 131 of the ladder network and two of its rungs 132, 133. By physically interrupting either side of the ladder, the conductor (drive line) may bypass or link with the core. In FIG. 9, note where the sides of the ladder must be punched 110, 111 to obtain a logical 0 from a given bit position. Note where the sides of the ladder must be punched 112, 113 to obtain a logical 1 from a given bit position. The arrows 135–138 in FIG. 9 are intended to show the direction in which the current 139, 140 in the conductor tends to wrap, or link with the U-core. Note that the currents 137, 138 for word 105 and word 106 logical 1's wrap the U-core in the same direction, thus giving the same polarity signal to the sense amp for a logical 1. The currents 135, 136 for a logical 0 in both 105 and 106 words bypass the cores. However, a very small current noise signal is generated in the sense line. The logical 0 signal is blocked at the sense amplifier.

Figure 11:
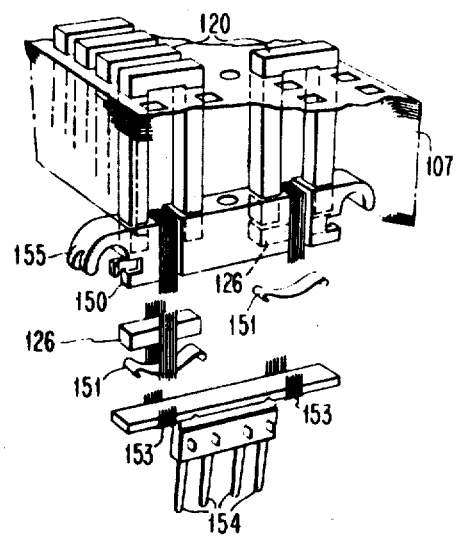
Figure 12:
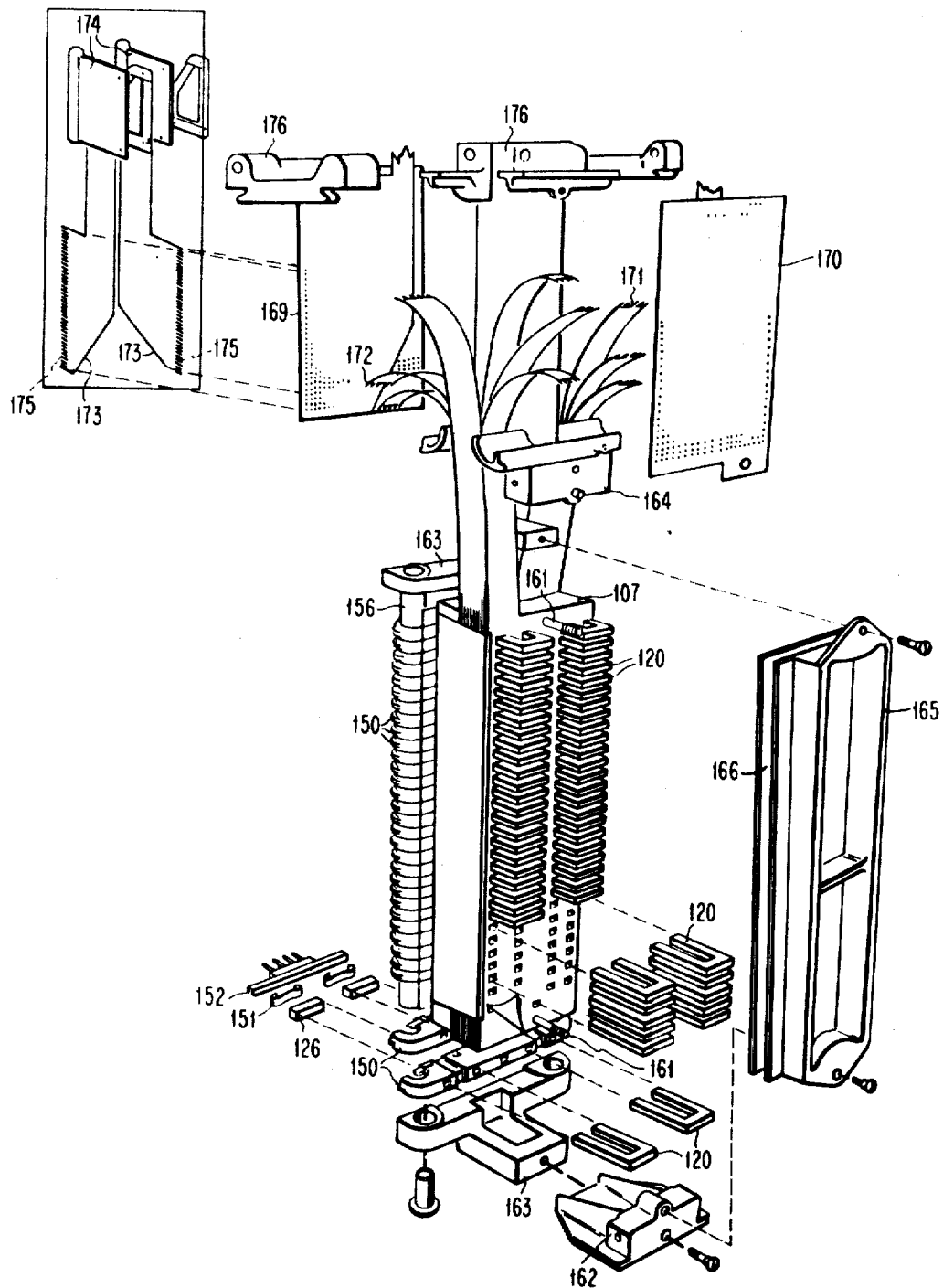

The module physical construction is shown in FIGS. 11 and 12. A TROS module is the building block for every TROS array. The plastic tapes 107 are contained in a tape deck carrying a total of 256 TROS words. Holes are punched between the ladder network of the tape to accept the U-cores 120 which pass through the tapes to mate with the I-cores 126. The I-cores are held in a core carrier assembly consisting of parts 150–152.

The core carrier assembly includes a core carrier 150 into which the I-cores 126 are inserted. Springs 151 are placed behind the I-cores to ensure proper contact with the U-cores 120. The springs in the I-cores are held in position by strips 152 which are clipped into the core carrier 150. The sense windings 153 are wound round the core carrier 150, encircling the I pieces 126. The ends of the sense windings are connected to the pins 154 on the contact strip. On one end of the core carrier there is a boss 155 to enable correct visual orientation when placing the core carrier onto support rods 156. If assembled incorrectly it would be impossible to connect the module to the TROS gate.

The tapes are lifted on and off the module by rails 160 and located by means of aligning pins 161, screwed into support 162. Blocks 163 carry the two rods 156 for the core-carrier assemblies 153 to clip onto. There are thirty carriers. The support 162 and chassis 164 screw into blocks 163 and are spaced by the rails 160.

The U-cores 120 are held in the module by the retainer 165 and insulator 166. The retainer 165 screws into the support 162 and chassis 164, and forces the U-cores 120 against the I-cores.

Connected to the chassis 164 are the module end boards 169, 170 to carry the diodes used for TROS word addressing and connections to the tapes in the tape deck. The diode board 169 nearest the I-cores 126 is defined as the bottom end board, and the diode board 170 nearest the U-core retainer 165 as the top end board.

The connections to the TROS tape consist of pins 171 placed in plated thru holes 172 in the diode board 169, 170 on which the four tape terminal connections are pressed.

Input/output connections to the module and boards are made by tapes 173 and paddles 174. The tapes have pins 175 passing through plated holes 172 in the diode boards and soldered to the printed circuitry on the diode boards. The tapes are clamped to the chassis 164 by clamps 176 so as to relieve any strain in the connections to the diode boards.

FIGS. 13–16 illustrate laminar bus 180. When a number of modules have been assembled, the sense windings associated with each particular bit of a module are connected in parallel. In FIG. 13 the sense windings 181 for a particular bit in each of the modules are shown connected in parallel with a terminating resistor 182. The terminative resistor is shown connected to the laminar bus 180. As shown in FIGS. 15 and 16, each laminar bus includes four conductors 183–186 printed on a strip of non-conducting material. As shown in FIGS. 13 and 14, each conductor has pins 187 connected to it, coinciding with the pins 154 on the core carrier. The pins 154 of the core carrier are soldered to those 187 of the laminar bus bar 180.

Figure 19:
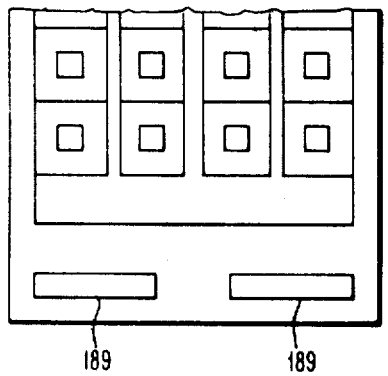

The TROS tape deck is illustrated in FIGS. 17–19. The tapes are numbered 189 from top to bottom. Three types of tapes 190–192 reduce inter-tape capacitance. A resistance tape 193 isolates two facing tapes and provides a resistance loop 195 around each leg of each U-core 120 to dampen resonance.

The upper tapes 193 in the module are installed facing in the opposite direction from the lower tapes 194. This creates more space for the connection of the tape ends 171 to the module end boards 170. The bottom of the module is defined as the side nearer the I-cores. The tapes 194 in the lower half of the tape deck are numbered from the bottom up. The tapes 193 in the upper half of the tape deck are numbered from the top down. On the end of the TROS tape there are two copper tabs 189 which serve to identify the tape.

To reduce the capacitance between the drive wires on adjacent tapes, three different types of tapes 190–192 are used. On each type, the conductor pattern is displaced from the U-core hole by a different amount. These three types of tapes are labeled A, B and C and are arranged sequentially throughout the deck of tapes 107.

Figure 20:
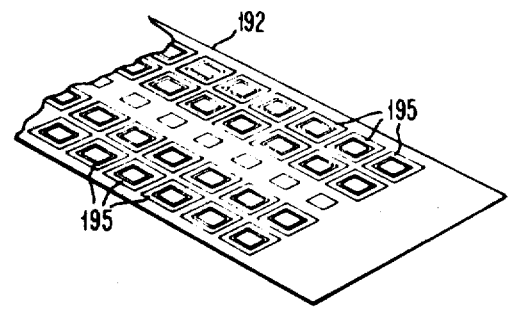

FIG. 20 illustrates the resistance tape 192. To damp any resonance which might be caused by inter-type capacity and flux leakage, a distributed loss is introduced. This is achieved by including in each module a plain plastic resistance tape 192 on which single turns of resistance foil 195 are etched. These resistance loops are also covered with a plastic insulating layer. The single resistance loops encircle each leg of each U-core.

The tapes in the tape deck are divided equally into sections, with end terminations passing on either side of the chassis. Since all tapes are similar in their basic construction, the bottom set of tapes is completely reversed with respect to the top set. Therefore, to prevent the wiring on the two facing tapes from touching, the resistance tape 192 is locatedd between these two tapes.

Figure 21:
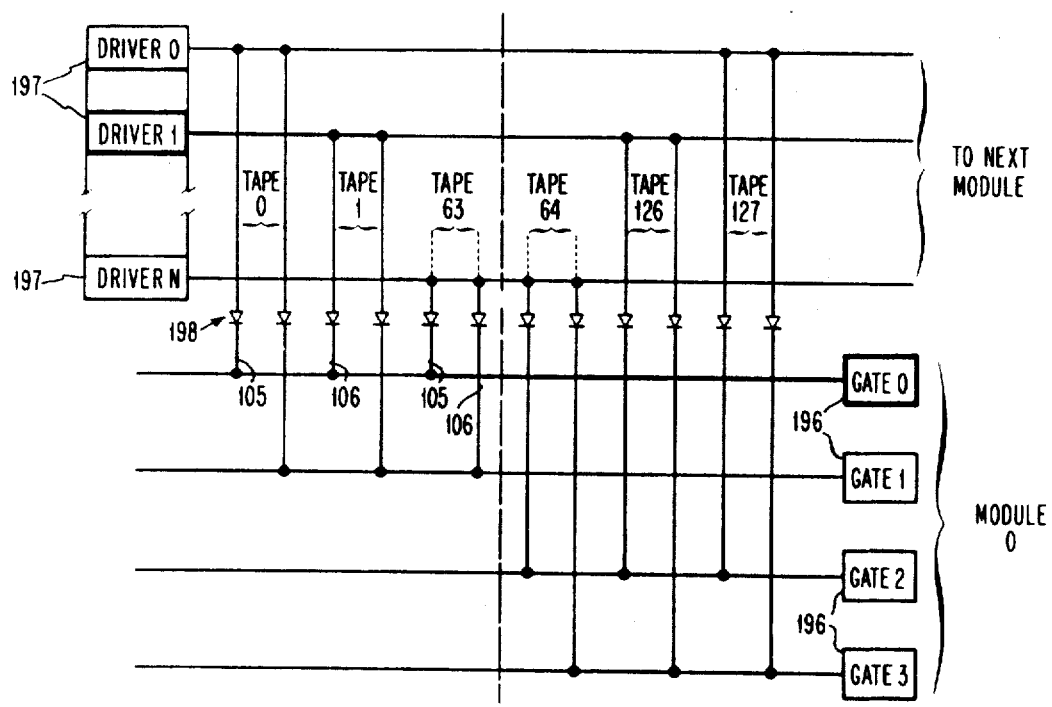

A 12-bit address register is used to address TROS. Referring to FIG. 21, addressing of any of the words of TROS is accomplished by the outputs of a matrix. Gates 196 and drivers 197 form the inputs to the matrix. Each of the TROS modules is addressed by a matrix made up of 64 drivers 197 and four of the gates 196. One driver and one gate are required to address any of the TROS words.

Addressing for the 256 word lines of a single module is accomplished by a matrix made up of 64 drivers 197 and four gates 196. The drivers are common to all eight modules. Module No. 0 is driven by four of the gates (Gates No. 0–3). Module No. 1 is driven by gates No. 4–7, etc.

To address any word in TROS a drive circuit 197 is needed at one end of the drive line and a gate circuit 196 at the other end. For example, the drive line for word No. 3 is energized by turning on driver No. 1 and gate No. 0. The diodes 198 on the driver side of the drive lines 105, 106 prevent back circuits through other drive lines and drivers.

Referring to FIGS. 21–28, the 128 tapes 107 in a module are terminated on two module end boards 169, 170. The isolating diodes 198 in the form of four double diode substrate blocks are also mounted on two module end boards. The commoning of lines on the module end boards is as follows.

Drive commoning: Because 64 drivers 197 are used for the 256 word lines, four word lines 105, 106 from each module are commoned to one driver. The 4 word lines are the lines 105, 106 on any particular tape together with the lines on the corresponding tape in the other (upper or lower) half of the module. For example, the two sets of words on tape No. 95, together with the two sets of words on tape No. 32 are commoned to driver No. 32 which is connected to terminal 199.

Gate commoning: Each module has 256 word lines 105, 106 and 4 gates 196 with 64 word lines commoned to each gate. In the upper half of the module, all the lines 105 are taken to one gate 200, all the lines 106 to another gate 201, and similarly in the lower half of the module. Gates No. 0–3 are connected to module No. 0, gates No. 4–7 are connected to module No. 1, etc. For example, the words 106 of tapes No. 64 through 127 are commoned 200 to gate No. 3 and the words 105 of tapes No. 64 through 127 are commoned 201 to gate No. 2.

In the lower deck all the words 105 are commoned to gate No. 0 and all the words 106 to gate No. 1.

The diode substrate is shown in FIGS. 27 and 28. The diodes 198 in series with the word lines of the driver are in substrate blocks 205 in the module end boards 169, 170. Each board carries 16 substrate blocks 205, each containing eight diodes 198. FIGS. 27 and 28 show the layout of the isolating diodes 198.

Figure 29:
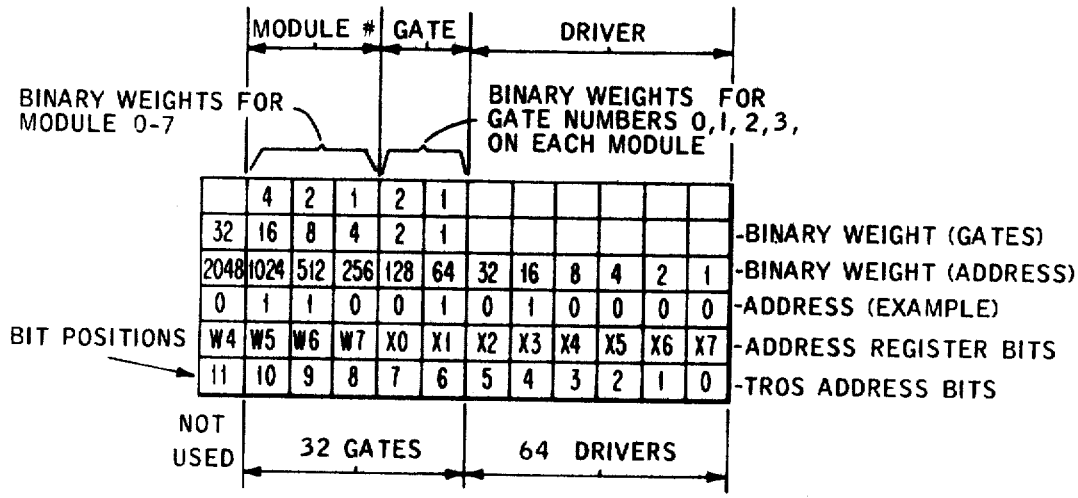
Figure 30:
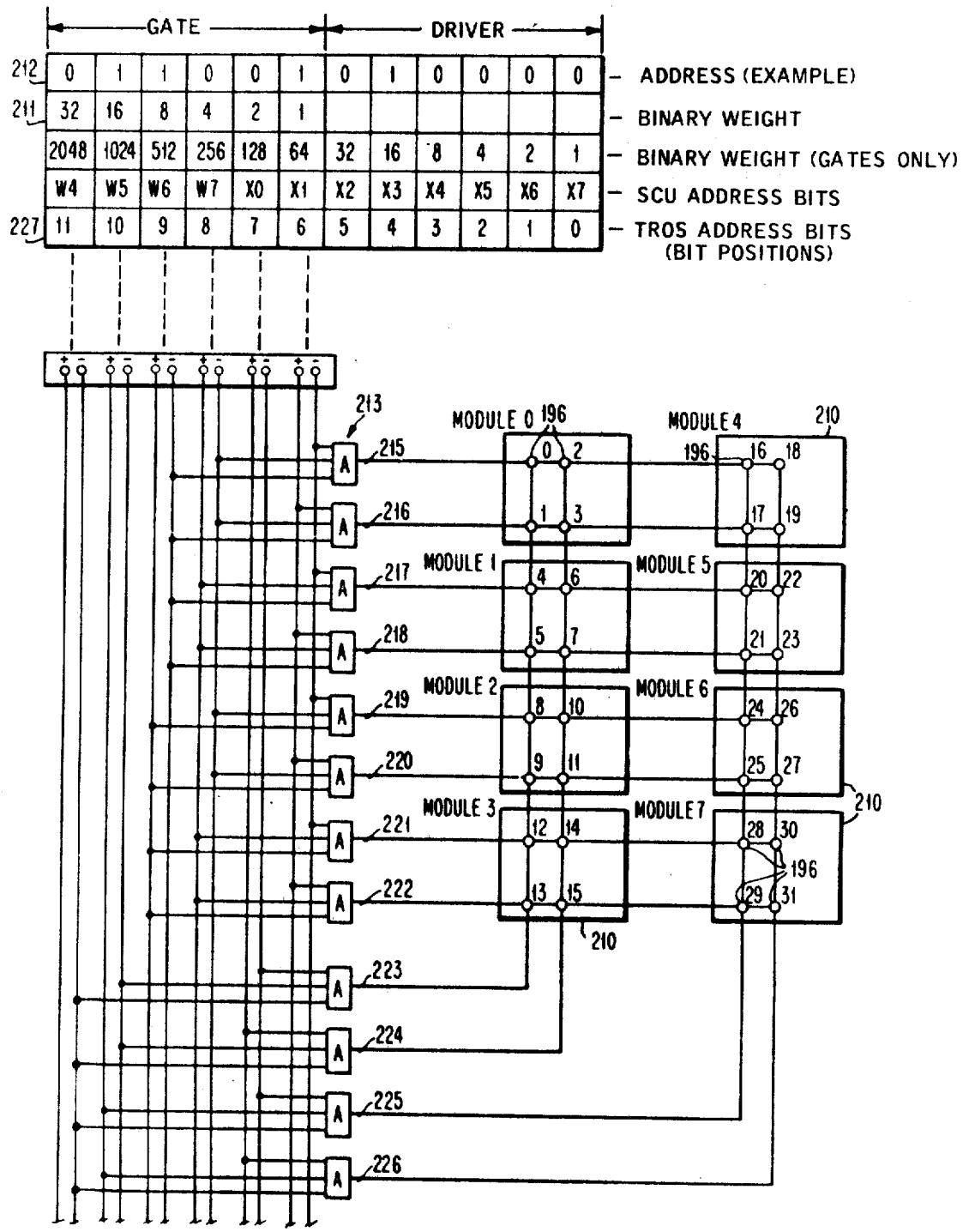
Figure 31:
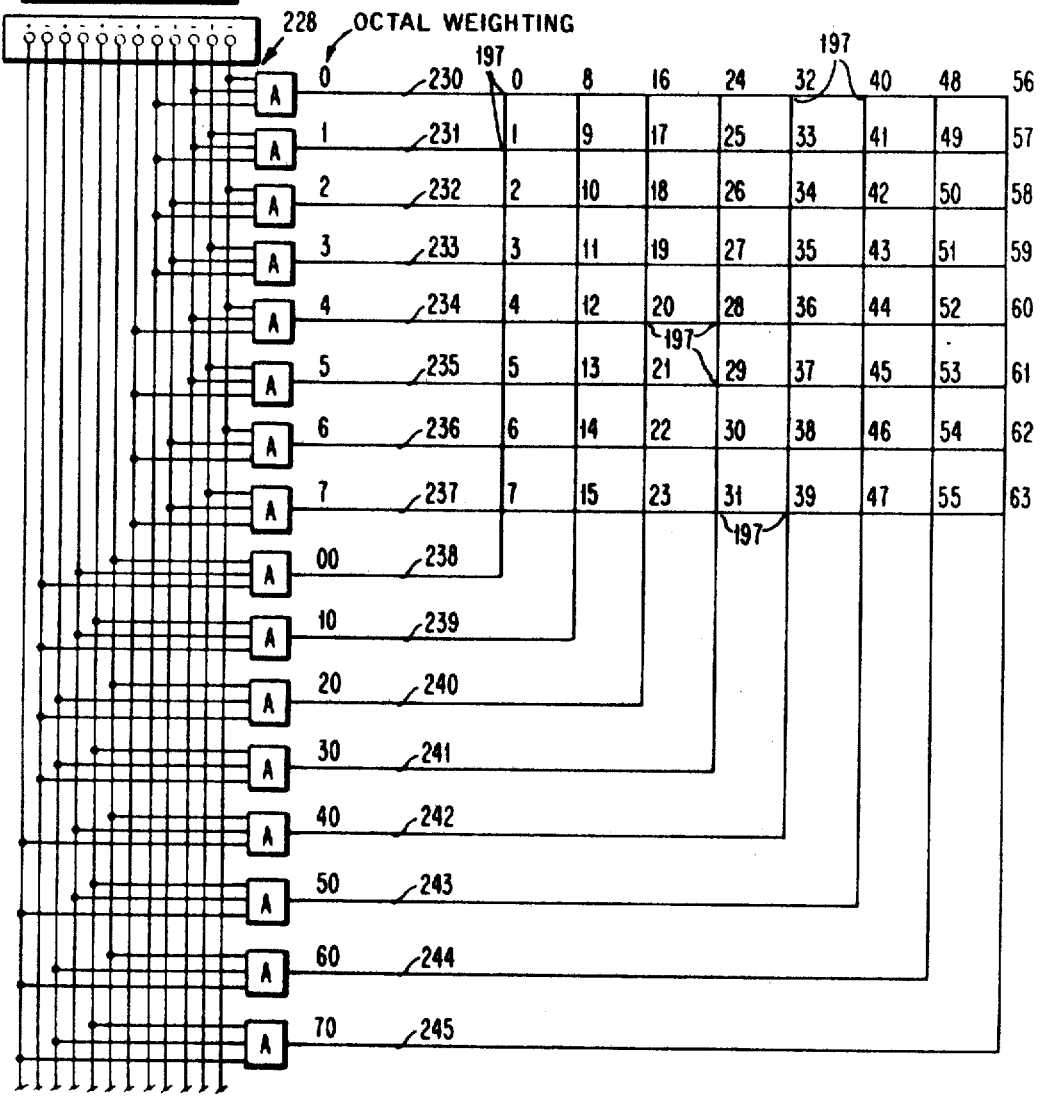

The decoding of the output of address register 49 is illustrated in FIGS. 29–31. As shown by the table of FIG. 29, bits No. 11–6 of the address register develop the gate address. Bits No. 5–0 of the address register develop the driver address. The binary weight of the address register positions 10–6 gives the gate number. The binary weight of the address register positions 10–8 give the module number 0–7. The binary weight of the address register positions 7 and 6 give the gate number 0–3 on each module. The binary weight of the address register positions 5–0 gives the driver number.

Gate decoding is shown in FIG. 30. The gate and module numbers can be determined by either of two methods. Once the gate and module numbers are known, the decoder circuit required to develop the module 210 and gate 196 can be found.

In method 1, the binary weight 211 of positions 10–6 (gates only) gives the number of the gate. In example 211, the binary sequence 11001 equals gate No. 25. From FIG. 30, gate No. 25 goes to module No. 6. Decoder 213 outputs 220 and 225 are required. The switching in the decoder required to give these outputs can now be determined.

In method 2, the binary weight 211 of bit positions 10, 9 and 8 (227) gives the module number. The binary weight of positions 7 and 6 gives the gate number (0–3) on each module. For example, module No. 6 gate No. 0 is gate No. 24, module No. 6 gate No. 1 is gate No. 25, etc. Once the module 210 and gate 196 are determined, the required switching can be found.

Driver decoding 228 is shown in FIG. 31. The driver number and decoder switching can be determined by either of two methods.

In method 1, the binary weight 229 (address) of positions 5–0 gives the driver number. A study of the matrix, once the driver 197 is known, gives the required decoder output lines. For example, driver No. 16 requires decoder output lines 230 and 240. The example bit pattern (246) of the binary sequence 010000 gives this decoder output.

In method 2, bits No. 2–0 can be decoded to give the decoder output low order octal digit. Bits No. 5–3 can be decoded to give the decoder high order octal digit. The combination of two decoder outputs gives the driver 197 in octal (297). For example, the binary bits 246 decode to octal 2 and 0 and the interaction of lines 230 and 240 in the matrix gives driver No. 16.

Determining tape numbers can be made by referring to FIG. 29. After the driver 197 is selected, the tape number can be determined by examining the bit in position 7 (X0). From FIGS. 22 and 23, gates No. 0 and 1 select tapes No. 0–63, and gates No. 2 and 3 select tapes No. 64–127. If X0 is on, gate No. 2 or No. 3 is selected and the actual tape number is determined by subtracting the previously determined driver number from 127. If X0 is off, the driver number equals the tape number.

In FIG. 29, the word 105 or 106 on this tape is determined by examining the bit in position 6 (X1). From FIGS. 22 and 23, gates No. 1 and 3 are connected to 106 words. If X1 is on, gate No. 1 or No. 3 is developed and thus a 106-word is addressed.

Figure 32:
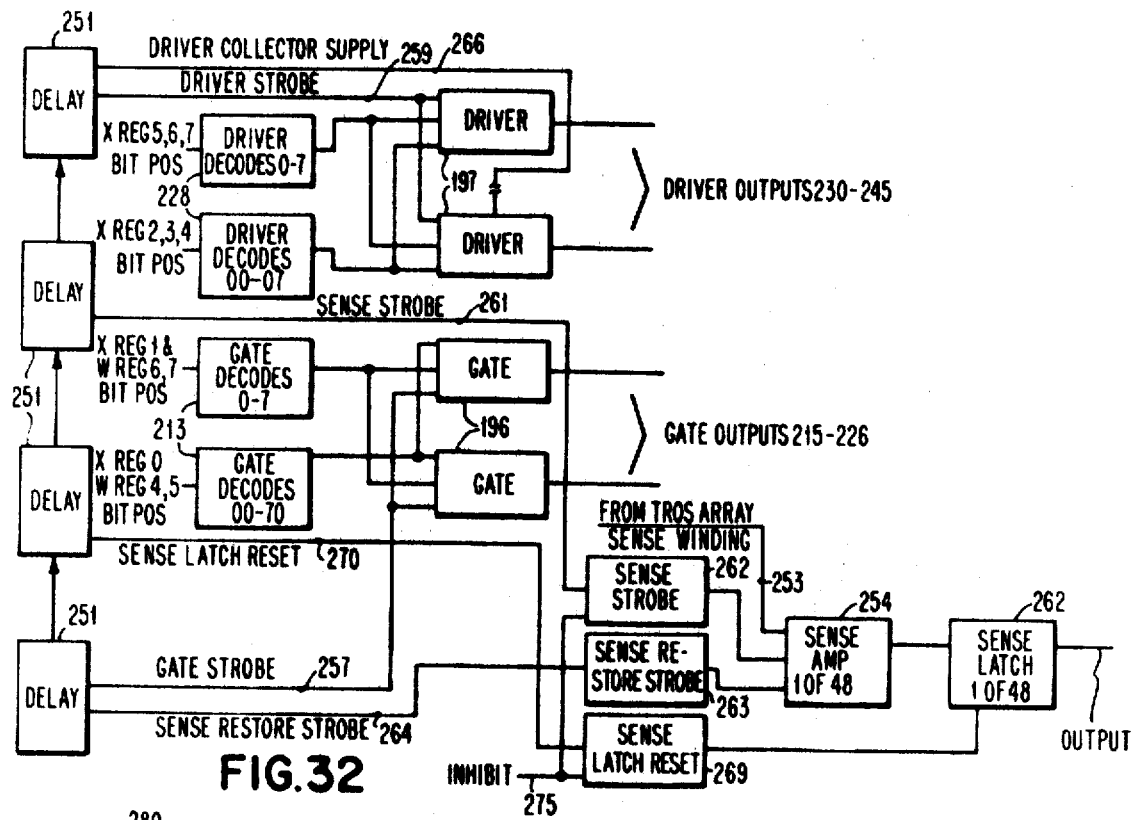

TROS functional operation is summarized as follows with reference to FIGS. 32 and 33. TROS timing is developed from a pulse at input 250 from clock 73 as employed in a delay line 251. Voltage level 252 at the input 253 to sense amplifier 254 is restored 255 so the sense amplifier can accept information to be read. The W and X address registers 49 are decoded 213, 228 to select a gate 196 and driver 197. The gate strobe 256, 257 switches the selected gate 196 on. The driver 197 is selected and when the driver strobe 258, 259 comes on, array current flows through the selected word line. The sense strobe 260, 261 samples 262 the 48 sense line outputs 253 to turn on the selected sense amplifier 254. Nonselected drivers are isolated by reverse-biased diodes 198.

The timing for TROS is obtained by feeding a periodic clock pulse 250 to TROS, putting this clock pulse into a series of delay lines 251 and tapping the delay lines at various points to obtain the required time pulses.

The sense amplifier 254 is designed so that before a sense pulse appears at the input 253, the input of the threshold stage must be restored to a controlling level by applying a constant sense restore voltage 255 for a time. The restore circuit 265 is activated by the sense restore strobe 264.

While the sense amplifier threshold is being restored, the W and X address register 49 is decoded 213, 228 to select a gate 196 and driver 197. When the gate strobe 256 appears at the selected gate, the gate switches on.

Until a driver 197 is selected, no array current can flow. The selected gate 196 has time to bring the 64 word lines connected to its output down to near ground potential, giving a quicker rise of the array current.

Earlier, the driver collector supply 256, 266 was turned on. The driver to be activated is selected by decoder 228, and after the driver strobe 258, 259 has activated the selected driver, the array current starts to flow in lines 253.

The sense strobe 260, 161 appears at the input 267 to the sense amplifiers 254 a time after the start of the array current. In this time the noise of zeroes being read dies away while the ones, which are much longer, are still present. The sense latches 268 have been reset 269–271, and are now set with a new TROS word.

The driver collector supply is turned off 272, stopping at array current.

TROS inhibit 275 prevents the setting and resetting of the sense latches 268 by inhibiting the generation of the sense reset 271 and sense strobe 260 pluses. The last word set into the sense latches before the rise of inhibit remains unchanged until the fall of inhibit.

Figure 34:
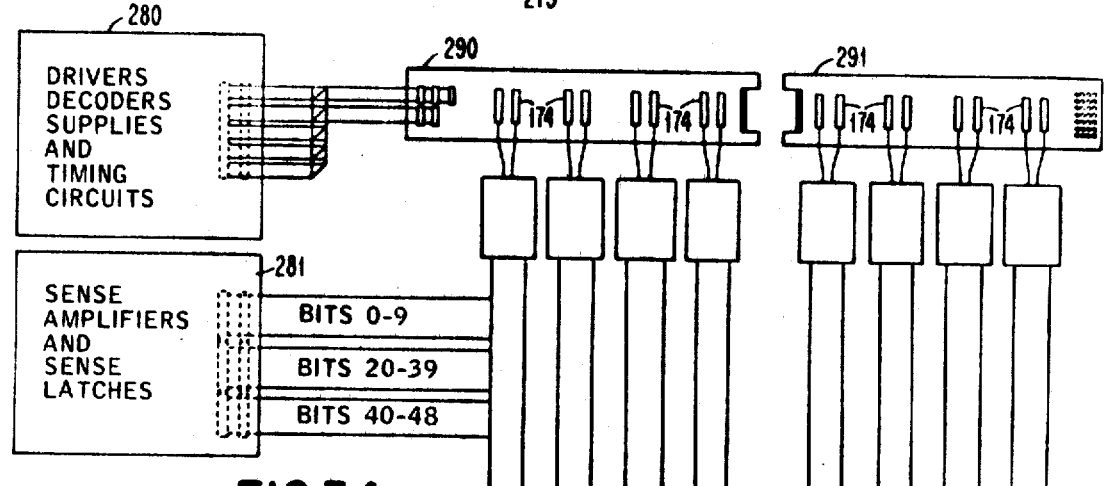
Figure 35:
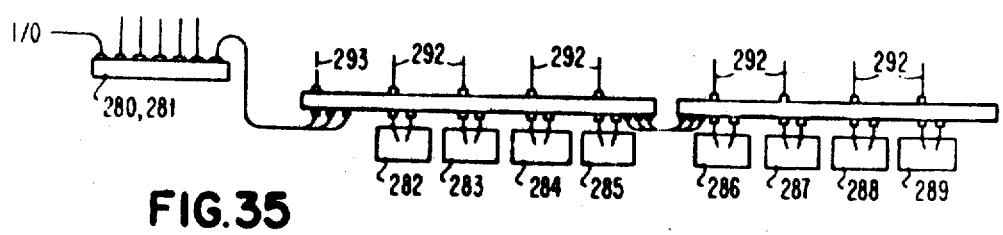

An example of the general array layout of TROS is shown in FIGS. 34 and 35. The decoders, drivers, timing cards, sense amplifiers and sense latches are on the two large boards 280, 281.

The connection between the TROS modules 282–289 and the large circuit boards 280, 281 is via the two module connection or commoning boards 290, 291. All necessary module interconnection wiring for drivers and gates is done on these boards. The paddle connectors 174 from the TROS modules are plugged into the module connection boards that carry the gate circuit cards 292, and the gate strobe card 293. There is one gate circuit card 292 for each module, and one gate strobe card 293 for every eight modules.

The TROS output word is split into many separate control fields. Each control field controls a separate part of the control unit hardware.

Examples of some control fields are as follows: Field CN—six output bits—used to provide bits 0–5 of the X register 49 for the next word to be addressed in the microprogram. Field PN—one output bit—used to maintain odd parity in the CN field. Field CD—five output controls the destination of the information on the D bus 40. Field CV—one output bit—used to gate the true or complement side of a register 43 to the ALU 36. Field CC—three output bits—used to control the carry function and logical operation of ALU 36. Field CS—four output bits —used to control set and reset of a register. Field PC—one output bit—used to maintain overall odd parity of Fields CC, CD, CD ALT, CS, CV, BP and PC. Field PS—one output bit—used to maintain overall odd parity of fields CA, CA ALT, CB, CK, CH, CL and PA. Field BP—one output bit—when active (1-bit) one of the registers 43 is presented directly to the D bus 40. A register is also presented directly to the ALU 36 for parity checking. If the output of the ALU parity bit and the parity bit of a selected register do not match, an ALU check is indicated. Field CH—four output bits—used to control the X register 49 bit position 6 for branching purposes. Field CL—four output bits—used to control the X register 49 bit position 7 for branching purposes. Field CA—five output bits—used to control the data source for a selected register. Field CB—two output bits—used to control the data source for another register. Field CK—eight output bits—used to provide a constant to a selected register or W register 49. Field PA—one output bit—used to check W and X register 49 parity.

The following fields of the TROS word have control latches: CD, CV, CC, CS, CN5. The purpose of the control latch is to have the control field output available for a whole cycle.

A TROS address check detects internal addressing failure causing an address check. The W and X register parity bits are EXCLUSIVE-ORed and the results set into a polarity hold latch every cycle. The output of the polarity hold latch is analyzed along with PA bit and/or the CN field parity. If an address check condition is present, the address error latch is set and the control unit comes to a stop.

For the TROS sense amplifier check, the CA, CA ALT, CB, CK, CL, CH, PS and PA fields are check for a total odd bit count every cycle. The PS bit is punched in the TROS tape to make the total bit count odd. A total even bit count causes the sense amp error latch to turn on and the control unit to come to a stop.

For the TROS control register check, the CC, CD, CD ALT, CV, CS, PC and BP fields are checked for a total odd bit count every cycle. The PC bit is punched in the TROS tape to make the total bit count odd. A total even bit count causes the control register error latch to turn on and the control unit to come to a stop.

Input data register 53 and output data reigster 60 in fact utilize the same register but with different logic and gating to respectively serialize or deserialize data.

The following circuitry is in addition to or altered from that described in the above cited field engineering manuals.

A magnetic core storage array, called buffer 62, is provided together with associated core read, write, addressing and clocking circuitry. The core array 62 is identical to that commercially available in the present IBM model 360/20, 1800, and 1130.

Specifically, data to be written in the buffer 62 is transmitted from D bus 40 on cable 63 to data registers 64.

Data registers 64 comprise two registers in parallel together with switching circuitry to gate data from D bus 40 first to register A, then to register B. Each register holds a plurality of bits called a "byte." When both registers are filled with data, or if only one register is to be filled, the data is simultaneously transmitted on cable 65 from both registers to the buffer 62.

The address in the core storage unit 62 into which the data is inserted is controlled by the address data transmitted from D bus 40 over cables 66 or 67 to address register 68 or address register 69. The choice of which address register to use is controlled by read-only control storage 38, and is not important here. The address specifies the bit position in the core storage unit for the first bit of two bytes of data transmitted in parallel from both data registers 64.

The address is transmitted from address register 68 or address register 69 over cable 70 to buffer address register 71. This register stores the proper core address and contains control circuitry to drive, over cable 72, the cores at the designated addressed bytes of core into which the transmitted data is thereby inserted by conventional core driving techniques.

To read data from the memory, the address of the desired data in the core buffer 62 is transmitted from D bus 40 over cables 66 or 67 to address register 68 or 69 in the same manner as the write operation. This address is then transmitted over cable 60 to buffer address register 61 which drives, over cable 72, the addressed two bytes of cores. The two bytes of data in the addressed cores are transmitted in parallel on cable 74 to data registers A and B comprising data register 64. The switching circuitry of the data register 64 then operates to gate the data first from register A, then from register B, over cable 75 to A bus 35.

Where data more than two bytes in length is to be stored in or read from the core buffer 62, it is desirable to avoid the necessity of transmitting the address of each subsequent two bytes of data. Hence, the address of each two bytes of data which is inserted in or read from the core is transmitted on cable 76 to incrementing circuit 77. This circuit adds a constant to the address of the prior data to form a new address two bytes higher than that of the previous address, and transmits the new address on cable 78 to address registers 68 and 69. The gating circuitry at the address registers gates the new address to the register 68 or 69 which handled the previous address. The incrementing circuit thus continues operation through the end of the sequence of data presented from D bus 40 or read onto A bus 35.

The timing of the various operations of the described circuitry is controlled by timing apparatus 73 in accordance with conventional techniques.

Other additional circuitry comprises file condition circuitry 79. This circuitry comprises OR circuits interconnecting the cable 80 from the individual files, logic decoding circuitry, and registers for storing ORed or decoded data. For example, each file establishes a voltage level on one line of the cable when the file has completed a seek operation. These voltage levels are ORed together in file condition circuitry 79 to establish an output on one line of cable 81 when gated therefrom. This signal thus indcates that at least one of the storage files 55, 56 has completed a seek operation.

The address of the cylinder, including the device address, is also transmitted on cable 80 to file condition circuitry 79 when a seek has been completed. The cylinder address is decoded by a logic circuit which sets a bit in a position of a register therein indicating the device which has completed a seek.

In addition, the read-only control storage 38 may operate to transmit a test command on the B bus 37 and operate control decode circuitry 39 to gate the command to control register 52, which command selects the designated device 56, causing it to transmit a code word on cable 80. This code word will designate the device sending the code word and the present status of the device. This code word is accepted by file condition circuitry 79, stored therein, and, upon gating thereof, transmits the word on cable 81 to A bus 35.

The operation of the apparatus of FIG. 5 to perform the method diagrammed in FIG. 3 will now be described.

Assuming the control unit is in S/T category 18, the CPU may transmit an instruction thereto. Included in this instruction is an address designating the control unit and designating the storage device 56 connected to the control unit, and a code word indicating the CPU wishes to issue a set of instructions thereto. CPU data and control interface 33 indicates to the CPU that the control unit of FIG. 5 has been selected and transmits the device address and the code word over cable 34. The data is transmitted by A bus 35 to ALU 36. Since the control unit is in S/T category 18, the read-only storage unit 38 comprising that category is in effect, causing ALU 36 to transmit the data via D bus 40 and cable 42, into a general purpose register 43.

The code word is sent over cable 48, modifying in circuit 47 the address of the following read-only storage unit received from read-only control storage module 38. The modified address is decoded by address control circuitry 49 to select a read-only storage unit. Pulses from the read-only storage unit are decoded by control decode circuitry 39 which operates to gate out the contents of a register 43 in which each bit position corresponds to a storage device and a "one" indicates an instruction is outstanding for that device, i.e. and a "zero" indicates the device is available.

This data is decoded by the read-only storage unit and a "busy" or "available" code is transmitted via B bus 37, ALU 36, D bus 40 and cable 41 to the CPU data and control interface 33. This code indicates whether the device is available or unavailable, thereby accepting or rejecting the command.

Assuming the file is available, the CPU transmits the instruction set and accompanying data, if any, over cable 34 a parallel byte at a time. Each byte is transmitted via A bus 35, ALU 36, D bus 40 and cable 63 to data register 64.

The address of the first core position of the instruction set is set in address register 68 or 69. When two bytes of data have been et in data register 64, they are transmitted in parallel on cable 65. At the same time, the core address is transmitted on cable 70 to buffer address register 71. The buffer address register operates to drive the addressed cores of buffer 62 to set therein the data from cable 65.

The address is also transmitted on cable 76 to incrementing circuit 77 which adds a constant to the received address. The resultant new address is inserted in the address register 68 or 69 which contained the previous address.

When the next two bytes of data have been received, the incremented address is transmitted to buffer register 71 to cause the two bytes of data to be set into core buffer 62.

The process then continues until all of the instruction set and data has been properly inserted in the instruction set area of the core buffer and the data area of the core buffer, respectively, set aside for the designated file.

At the conclusion of writing the information into core, the read-only control store 38 transmits a code word via B bus 37, ALU 36, D bus 40 and cable 41 to the CPU to indicate that the information has been properly received and stored. The read-only storage unit also causes a bit to be inserted in the bit position of a register 43 that designates that that device is busy.

Since the accept start function of category S/T 18 has been completed, the system now cycles to FS category 19.

The next addressed read-only control storage unit causes a portion of the stored instruction set to be read out of core and compared in ALU 36 to a code word set into the ALU from B bus 37 by the read-only storage unit. A positive comparison indicates that a seek instruction is included in the instruction set.

The next read-only storage unit then causes the seek address (the desired cylinder, as described above, of the selected file 56) to be read out of core buffer 62. The seek address is transmitted on cable 50 to control register 52 and the circuitry thereof operated to issue the seek address to the seek apparatus 55 of the selected storage device 56.

Thus, the seek has been initiated and the system refers to decision logic 22 to determine whether any incompleted instruction sets are being executed. The logic actually comprises a specific address of core buffer 62 which is addressed by read-only control store 38. The addressed portion of core contains the designation of the storage device, if any, with a partially completed instruction set.

In this case, it is assumed that there is no outstanding, partially completed instruction set. Hence, the system cycles back to S/T category 18 for a short predetermined period of time to allow the CPU to transmit another instruction set, if desired. Recycling back to S/I category 18 continues so long as the CPU continues to supply an instruction during each such predetermined time period, Then, the system cycles to FS category 19 and tests for a seek complete.

First, however, queueing of a seek complete will be described. When the access mechanism of the selected device has reached the desired cylinder, the seek circuitry 55 thereof immediately sets a voltage level on one line of cable 80. This voltage level indicates that at least one device has a seek complete. In addition, the seek circuitry 55 transmits the address of the cylinder, including the device address, on cable 80 to file condition circuitry 79. This circuitry responds by setting a bit in the bit position of a register therein corresponding to that device. This bit designates the device queueing the seek complete.

Thus, if a number of instruction sets had been received from the CPU during a number of S/T time sequences, each followed by an initiate seek function, a number of seeks may stand completed at any one time. Thus, the voltage levels would be ORed together in file condition circuitry 79. In addition, the bit position in the register for each device having a seek complete would be filled.

To test for a seek complete, the voltage level from the OR circuit in file condition circuitry is gated out on cable 81 to A bus 35 to ALU 36. The voltage level is detected, indicating at least one device has completed a seek.

Hence, a read-only storage unit is activated which causes file condition circuitry 79 to gate out the contents of the queue register therein onto cable 81. The ALU 36 selects the bit in a bit position standing highest in a predetermined order, and transmits the designation of the selected device to a general purpose register 43.

The test for seek complete operation has therefore been completed and the multiplexing control cycles to FD category 20.

The next read-only storage unit then addresses the specific location in core storage 62 referred to as decision logic 22. The designation of the selected device is then gated from the general purpose register 43 in which it is stored, via cable 46, B bus 37, ALU 26 and cable 63 to data register A of data registers 64, and stored in the decision logic area of core buffer 62.

The next read-only storage unit then causes the device designation to be read out (all read-outs are non-destructive, as described above) of the area 22 of buffer 62 and causes the head selection to be read out of the instruction set for the designated device and supplies the designations to control register 52 together with a search command.

Referring additionally to FIG. 4, the control register circuitry responds by detecting the beginning of the first address key block 23 encountered by the designated head of the designated device. The control register then operates the read circuitry 55 of the selected device 56 to thereby gate out the contents of block 23 therefrom onto line 59.

The serial data from line 59 is transmitted to read data register 60 which deserializes the data and transmits it in parallel bytes over cable 61 and B bus 37 to ALU 36.

Simultaneously, control register 52 indicates to R.O.C.S. address control 49 that an address-key block is being read. Address control 49 then selects a read-only storage unit 38 which reads out the device designation from decision logic area 22. The designation is used via ALU 36, to read the information from the instruction set 15 for the selected device, which information is the desired address-key. This information is transmitted to the data registers 64 and gated on a byte by byte onto cable 75 and A bus 35 to ALU 36.

The ALU 36 compares desired address-key data from A bus 35 to the address-key data 23 being read from the device.

If no comparison is made, the multiplex control cycles to RI and S/T categories 17 and 18.

If a comparison is made a "hit" is indicated (see comparison of A–K block 30 to the argument from instruction set 17, discussed above).

The comparison or lack of comparison are respectively indicated by the ALU to modifying circuitry 47 over D bus 40, GP registers 43 and cable 48.

Thus, if no hit occurs, the next address is not modified and the read-only storage unit selected initiates the RI and S/T categories.

If a hit does occur, however, the next address is modified, causing address control 49 to address a different read-only storage unit. The selected read-only storage unit causes the device designation to be read out of decision logic area 22 of buffer 62. This device designation is utilized, as above, to read the next instruction from instruction set 15 for the selected device.

This instruction may either be to read or to write, and is transmitted via A bus 35, ALU 36, D bus 40, and cable 42 to a general purpose register 43. The instruction is then sent over cable 48 to modifying circuitry 47 to cause address control 49 to select the next read-only storage unit.

Assuming the instruction was to write data, the read-only storage unit selected by the command transmits the device designation from the general purpose register to control register 52 together with operating circuitry therein to designate a write data command. The control register maintains connection with the previously selected read/write head which had read out the address-key.

The read-only control store 38 then utilizes the device designation from the general purpose register to address the data area 16 for the selected device. This address is inserted in address register 68 or 69 and transmitted to buffer address register 71, which drives the addressed cores of buffer 62. The addressed data is therefore transmitted two bytes at a time over cable 74 to data registers 64, as incrementing circuit 77 keeps updating the addressing of the data area of buffer 62 until all the data has been transmitted.

The data is then transmitted a byte at a time over cable 75, A bus 35, ALU 36 and cable 51 to write data register 53. The write data register converts each byte of data from parallel to serial form and the data is then serially transmitted on line 57 and written in the data area 32 of the storage device.

Upon completion of the write operation, the next read-only storage unit causes the device designation to be read from the decision logic area 22 of buffer 62, transmitted via cable 74, data register 64 and A bus 35 to ALU 36. The ALU converts the designation to a "one" bit in a position designating that device and transmits the bit via D bus 40, cable 63, data register A 64 and cable 65, and inserted in the "status" area of buffer 62. Next, the device designation is erased from the decision logic area of the buffer since all instructions for that device have been completed. The sequence control then cycles to RI category 17.

Assuming the instruction was to read, the selected read-only storage unit transmits the device designation from the general purpose register to control register 52 together with a command to read.

The control register therefore maintains the connection with the selected head in the storage device 56 and gates the data (data 32 in FIG. 4) onto line 59. The data is deserialized by read data register and transmitted via cable 61, B bus 37, ALU 36, D bus 40 and cable 63 to the data registers 64.

The read-only control store 38 then utilizes the device designation from the general purpose register 43 to address the data area 16 for the selected device. This address is used by buffer address register 71 to insert the first two bytes of data into the beginning of the proper data area 16. As additional data is received in the incrementer 77 continually updates the core address until all of data has been inserted in core.

Upon completion of the read operation, the next read-only storage unit causes the device designation to be read from the decision logic area 22 of buffer 62, decoded as above and the proper bit inserted in the "status" area of buffer 62. The next read-only storage unit then erases the device designation from the decision logic area of the buffer. The sequence control then cycles to RI category 17.

Upon cycling to RI category 17, the read-only storage control unit operates control decode circuitry 39 to transmit a predetermined voltage level (the "request interrupt" signal) to CPU data and control interface 33 for a predetermined time period. This signal indicates that the multiplexing control desires to present status to the CPU.

The CPU may not be prepared to accept the status and therefore let the time period lapse without responding. This means that the status is "stacked," as described above, and a request interrupt will be presented to the CPU each time the sequence control cycles to RI category 17.

The CPU "accepts" the status by transmitting a "polling" code word over cable 34 to A bus 35. This "pole" is not directed to any device, but rather to the control unit.

The polling code word is transmitted from A bus 35 via ALU 36, D bus 40, cable 42, a G.P. register 43 and cable 48 to modifying circuitry 47. This causes address control 49 to select a read-only storage unit which causes the readout of the content of the bit position of the "status" queue in buffer 52 having the status stored therein. If status has been stacked such that status information for a plurality of devices are stored therein, the readout is of the bit position designating the highest ordered device.

The information therefrom, comprising the device designation and status, either a "zero" or a "one," are transmitted via cable 74, data registers 64, cable 75, A bus 35, ALU 36, D bus 40 and cable 41 to the CPU. In addition, the read-only storage unit transmits the control unit designation to the CPU. The read-only storage unit then causes the status for that device to be erased from the status queue and the busy signal to be erased from the register 43.

The CPU remembers the command which it has given the device. Thus, a "one" indicates that a write operation was completed, a read operation was successfully completed, or a test has been completed. If the status means data was written into the storage device, the CPU does no more. However, if the status indicates that a read operation has been completed, the CPU must come back with a present data instruction for that device before sending another set of instructions. If another set of instructions are sent for that device, the data stored in the data area 16 is lost.

Upon receiving a present data command from the CPU, the sequence control shifts to S/T category 18. This command designates the control unit and device.

The device designation and present data command are transmitted via cable 34, A bus 35, ALU 36, D bus 40, cable 42, a general purpose register 43 and cable 48 to modifying circuitry 47. This causes address control 49 to select a read-only control unit which operates operates to place the address of the first bit of data area 16 for the designated device in address register 68 or 69 (similar to the write data operation). This address is used by buffer address register 71 to drive the selected cores of buffer 62 and also to send the address to incrementer 77. The data is then transmitted via cable 74 to data registers 64 two bytes at a time, as incrementer 77 continually updates the address until all the data is transmitted. The data is further transmitted a byte at a time via cable 75, A bus 35, ALU 36, D bus 40 and cable 41 to the CPU.

The only operation not yet described is the "accept test" operation of S/T category 18.

This function comprises transmission by the CPU over the cable 34 of a "test" command together with the control unit designation and device designation. This command is automatically accepted by the control and the selected read-only storage unit causes the instruction set 15 for that device and all queues therefore to be read out on D bus 40 and cable 41 to the CPU.

While the invention has been particularly shown and described with reference to preferred embodiments thereof, it will be understood by those skilled in the art that the foregoing and other changes in form and details may be made therein without departing from the spirit and scope of the invention.

What is claimed is:

1. A method of multiplexing the control, by instructions from an input/output means, of a plurality of data storage devices, wherein said instructions may contain a predetermined portion and a remaining portion, to thereby transfer data between said input/output means and said data storage devices, by apparatus including a plurality of storage means, one assigned to each one of said data storage devices for storage of an instruction for said storage device, said method comprising the steps of:

entering each of said instructions, each said instruction designating one of said plurality of data storage devices, from said input/output means into the one of said plurality of data storage means assigned to said data storage device designated by said instruction;

initiating execution of said predetermined portion of each said instruction upon said instruction being entered into said storage means; and executing said remaining portion of the one of said instructions entered in the one of said storage means assigned to the first one of said data storage devices having completed said predetermined portion of said instruction, said remaining portion of said instruction including a command to transfer data between said input/output means and said data storage device.

2. The method of claim 1 wherein:

said predetermined portion of said instructions comprises a "seek" command, said "seek" command directing that access be gained to a designated storage area of said storage device.

3. The method of claim 1 including the additional steps of:

detecting the completion of each said predetermined portion of said instructions for each of said data storage devices, and said executing step comprises executing said remaining portion of said detected instruction, said remaining portion of said instruction including a command to transfer data between said input/output means and said data storage device to which the storage means in which said instruction is entered is assigned.

4. The method of claim 1 wherein:

said instructions may each include a plurality of commands including a "seek" command and a "search" command, said "seek" command directing that access be gained to a designated area of said data storage device, and said search command directing that data in said designated area be examined to find specified data thereat;

said initiating, execution step comprises initiating execution of said "seek" command of each of said instructions upon said instruction being entered into said storage means, and said executing step comprises:

searching said designated area of the first one of said data storage devices having completed said "seek" command, said searching being commanded by said "search" command of said instruction entered in the one of said storage means assigned to said one data storage device, said searching continuing until said specified data is found, and transferring data between aid input/output means and said data storage device.

5. The method of claim 4 wherein said executing step comprises:
    searching said designated area of the first one of said data storage devices having completed said "seek" command, said searching being commanded by said "search" command of said instruction entered in the one of said storage means assigned to said one data storage device, said searching being discontinuous, allowing said input/output means to initiate said entering step during said discontinuities, said searching continuing in this manner until said specified data is found, and
    transferring data between said input/output means and said data storage device.

6. A method of multiplexing the control of a plurality of data storage devices by instructions from an input/output means, wherein said instructions may contain a predetermined portion and a remaining portion, to thereby transfer data between said input/output means and said data storage devices, by apparatus including a plurality of first storage means and a plurality of second storage means, wherein one of said first storage means is assigned to each one of said data storage devices for storage of an instruction for said storage device, and one of said second storage means is assigned to each one of said data storage devices for storage of any data associated with said instruction, said method comprising the steps of:
    entering each of said instructions, each said instruction designating one of said plurality of data storage devices, from said input/output means into the one of said plurality of data storage means assigned to said data storage device designated by said instruction;
    entering any data associated with each said instruction from said input/output means into the one of said plurality of second data storage means assigned to said data storage device designated by said associated instruction;
    initiating execution of said predetermined portion of each said instruction upon said instruction and any data associated therewith being entered, respectively, into said first and second storage means;
    executing said remaining portion of the one of said instructions entered in the one of said first storage means assigned to the first one of said data storage devices having completed said predetermined portion of said instruction, said remaining portion including a command to transfer data between said associated second storage means and said data storage device; and
    communicating with said input/output means to indicate thereto completion of said instruction and to transfer thereto any data from said storage device stored in said associated second storage means.

7. The method of claim 6 wherein:
said predetermined portion of said instruction comprises a "seek" command, said "seek" command directing that access be gained to a designated storage area of said storage device.

8. The method of claim 6 wherein:
said instructions may each include a plurality of commands including a "seek" command and a "search" command, said "seek" command directing that access be gained to a designated area of said data storage device, and said search command directing that data in said designated area be examined to find specified data thereat;
said initiating execution step comprises initiating execution of said "seek" command of each of said instructions upon said instruction being entered into said first storage means; and
said executing step comprises:
searching said designated area of the first one of said data storage devices having completed said "seek" command, said searching being commanded by said "search" command of said instruction entered in the one of said first storage means assigned to said one data storage device, said searching continuing until said specified data is found, and
transferring data between said associated second storage means and said data storage device.

9. The method of claim 8 wherein said executing step comprises:
    searching said designated area of the first one of said data storage devices having completed said "seek" command, said searching being commanded by said "search" command of said instruction entered in the one of said first storage means assigned to said one data storage device, said searching being discontinuous, allowing said input/output means to initiate said entering step during said discontinuities, said searchng continuing in this manner until said specified data is found, and
    transferring data between said associated second storage means and said data storage device.

10. Multiplexing control apparatus for controlling a plurality of data storage devices under the command of instructions, said instructions including a predetermined portion and a remaining portion, received from a central processing system to transfer data therebetween, comprising data storage control apparatus connected to said plurality of data storage devices and adapted to communicate with and control the operation of any one of said data storage devices at any one time, with the improvement thereof comprising:
    a plurality of storage means, each of said storage means correspondng to one of said data storage devices;
    directing means for receiving one of said instructions at a time, said instruction designating one of said data storage devices, said directing means storing said instruction in the one of said storage means corresponding to said designated data storage device;
    operating means capable of simultaneously operating each of said data storage devices independently to accomplish thereby said predetermined portion of each instruction designating a different one of said data storage devices, said operating means detecting said predetermined portion of each said instruction from said corresponding storage means upon said transfer thereto of said instruction by said directing means, said operating means thereupon initiating said operation of said data storage device designated by said instruction;
    monitoring means for monitoring the operation of said data storage devices by said operating means to detect completion thereby of said predetermined portion of an instruction by one of said data storage devices; and
    executing means for responding to said detection by said monitoring means to cause said data storage control apparatus to execute said remaining portion of the instruction stored in said storage means corresponding to said detected device.

11. The multiplexing control apparatus of claim 10 wherein:
said plurality of storage means each comprise individual areas of a magnetic core storage array.

12. The multiplexing control apparatus of claim 10 wherein:
said predetermined portion of said instructions comprises a "seek" command, said "seek" command directing said operating means to operate the data storage device designated by said instruction to gain access to a designated storage area thereof;
said remaining portion of said instructions includes a "search" command, said "search" command directing said executing means cause said storage control apparatus to examine data in said designated area to find specified data thereat, and includes a transfer command directing said executing means to cause said data storage control apparatus to transfer data between said data processing system and said designated data storage device; and said executing means comprises:

means responding to said detection by said monitoring means for detecting said "search" command in said storage means corresponding to said detected device and for causing said data storage control apparatus to execute said "search" command until said specified data is found thereby; and means responding to said finding of said specified data for detecting said transfer command in said corresponding storage means and for causing said data storage control apparatus to transfer data between said data processing system and said designated data storage device.

13. The multiplexing control apparatus to claim 12 additionally including:

sequencing means for intermittently interrupting said execution of said "search" command and allowing said directing means to receive further instructions during said interruptions.

14. The multiplexing control apparatus of claim 12 wherein:

each of said plurality of storage means are divided into first and second portions;

said directing means stores said received instruction in said first portion of said corresponding storage means and stores any data associated with said instruction, said data to be transferred from said data processing system to said designated data storage device, in said second portion of said corresponding storage means;

said operating means detects said "seek" command from said first portion of said corresponding storage means upon said transfer thereto of said instruction by said directing means; and said executing means comprises:

means responding to said detection by said monitoring means for detecting said "search" command in said first portion of said corresponding storage means;

means responding to said finding of said specified data for detecting said transfer command in said first portion of said corresponding storage means and for utilizing said data storage apparatus to transfer data between said second portion of said corresponding storage means and said data storage device; and means responding to such transfer to communicate with said data processing system to indicate thereto completion of said instruction and to transfer thereto from said second portion of said corresponding storage means any data stored therein from said transfer with said data storage device.

15. The multiplexing control apparatus of claim 14 additionally including:

sequencing means for intermittently interrupting said execution of said "search" command and allowing said directing means to receive further instructions and data during said interruptions.

16. The multiplexing control apparatus of claim 15 wherein:

said plurality of storage means each comprise individual areas of a magnetic core storage array, and each of said first and second portions thereof comprise parts of said individual areas.

References Cited

UNITED STATES PATENTS

| | | | |
|---|---|---|---|
| 3,029,414 | 4/1962 | Schrimpf | 340—172.5 |
| 3,133,268 | 5/1964 | Avakian et al. | 340—172.5 |
| 3,303,476 | 2/1967 | Moyer et al. | 340—172.5 |
| 3,377,619 | 4/1968 | Marsh et al. | 340—172.5 |

PAUL J. HENON, Primary Examiner

S. R. CHIRLIN, Assistant Examiner

UNITED STATES PATENT OFFICE
CERTIFICATE OF CORRECTION

Patent No. 3,544,966　　　　　　　Dated December 1, 1970

Inventor(s) John J. Harmon

It is certified that error appears in the above-identified patent and that said Letters Patent are hereby corrected as shown below:

In the heading to the drawings, line 4 of each sheet, "CONTROL", each occurrence, should read -- CENTRAL --. Column 2, line 30, "central" should read -- control --. Column 6, lines 44 and 45, cancel "The function "accept test" comprises transmission of a data" command" and insert -- The function "present data" is initiated by a "present data" command --. Column 13, line 43, beginning with "Control register 52" cancel all to and including "B bus 37." in line 59, same column 13. Column 17, line 31, "161" should read -- 261 --. Column 18, after line 38 insert lines 43 beginning with "Control register 52" through line 59, ending with "B bus 37." from column 13.

Signed and sealed this 4th day of May 1971.

(SEAL)
Attest:

EDWARD M. FLETCHER, JR.　　　　　WILLIAM E. SCHUYLER, JR.
Attesting Officer　　　　　　　　Commissioner of Patents